(12) United States Patent
Plut

(10) Patent No.: US 7,580,031 B2
(45) Date of Patent: *Aug. 25, 2009

(54) HISTOGRAM AND SPATIAL-BASED POWER SAVINGS

(75) Inventor: William J. Plut, Menlo Park, CA (US)

(73) Assignee: Honeywood Technologies, LLC, Menlo Park, CA (US)

(*) Notice: Subject to any disclaimer, the term of this patent is extended or adjusted under 35 U.S.C. 154(b) by 276 days.

This patent is subject to a terminal disclaimer.

(21) Appl. No.: 11/122,319

(22) Filed: May 4, 2005

(65) Prior Publication Data

US 2005/0275651 A1   Dec. 15, 2005

Related U.S. Application Data

(63) Continuation of application No. 10/891,734, filed on Jul. 15, 2004.

(60) Provisional application No. 60/487,761, filed on Jul. 16, 2003.

(51) Int. Cl.
G09G 5/00 (2006.01)

(52) U.S. Cl. .................................................. 345/204

(58) Field of Classification Search ............. 345/204, 345/211, 212–214, 698; 713/320, 324; 315/386; 348/556, 558, 564, 568, 569
See application file for complete search history.

(56) References Cited

U.S. PATENT DOCUMENTS

| | | | |
|---|---|---|---|
| 4,952,917 A | 8/1990 | Yabuuchi |
| 5,029,004 A | 7/1991 | Shibayama |
| 5,270,818 A | 12/1993 | Ottenstein |
| 5,359,345 A | 10/1994 | Hunter |
| 5,469,225 A | 11/1995 | Hong |
| 5,488,434 A | 1/1996 | Jung |
| 5,524,249 A | 6/1996 | Suboh |
| 5,572,655 A | 11/1996 | Tuljapurkar |
| 5,592,194 A | 1/1997 | Nishikawa |
| 5,598,565 A | 1/1997 | Reinhardt |
| 5,615,376 A | 3/1997 | Ranganathan |
| 5,619,707 A | 4/1997 | Suboh |
| 5,625,826 A | 4/1997 | Atkinson |
| 5,642,125 A | 6/1997 | Silverstein |
| 5,675,364 A | 10/1997 | Stedman |
| 5,719,958 A | 2/1998 | Wober |

(Continued)

OTHER PUBLICATIONS

Geelhoed et al, "Energy-aware User Interfaces and Energy-adaptive Displays: Improving Battery Lifetimes in Mobile Devices", Proceedings of MobiSys 2003: The First International Conference on Mobile Systems, Applications, and Services, San Francisco May 5-8, 2003.

(Continued)

*Primary Examiner*—Abbas I Abdulselam

(57) ABSTRACT

Described herein are systems and methods that reduce power consumption for an electronics device that includes a display. Power conservation systems and methods described herein alter video information in one or more inactive portions of a display area such that the alteration decreases power consumption. The invention finds use with many electronics devices, such as portable computing devices powered from a battery or other limited source of power. Since video output often dominates power consumption for an electronics device, decreasing display power consumption may extends battery longevity for the portable device.

20 Claims, 9 Drawing Sheets

U.S. PATENT DOCUMENTS

| | | | | |
|---|---|---|---|---|
| 5,745,375 | A | 4/1998 | Reinhardt | |
| 5,781,768 | A | 7/1998 | Jones, Jr. | |
| 5,796,391 | A | 8/1998 | Chiu | |
| 5,808,693 | A | 9/1998 | Yamashita | |
| 5,822,599 | A * | 10/1998 | Kidder et al. | 713/324 |
| 5,914,751 | A | 6/1999 | Korth | |
| 5,943,032 | A | 8/1999 | Nagaoka | |
| 5,956,014 | A | 9/1999 | Kuriyama | |
| 5,961,617 | A * | 10/1999 | Tsang | 710/100 |
| 5,991,883 | A | 11/1999 | Atkinson | |
| 6,026,179 | A | 2/2000 | Brett | |
| 6,029,249 | A | 2/2000 | Atkinson | |
| 6,031,914 | A | 2/2000 | Tewfik | |
| 6,043,853 | A | 3/2000 | Shimazaki | |
| 6,069,440 | A | 5/2000 | Shimizu | |
| 6,076,169 | A | 6/2000 | Lee | |
| 6,100,859 | A | 8/2000 | Kuriyama | |
| 6,104,362 | A | 8/2000 | Kuriyama | |
| 6,111,559 | A | 8/2000 | Motomura | |
| 6,144,440 | A | 11/2000 | Osgood | |
| 6,177,933 | B1 | 1/2001 | Young | |
| 6,177,946 | B1 | 1/2001 | Sinclair | |
| 6,232,937 | B1 | 5/2001 | Jacobsen | |
| 6,278,887 | B1 | 8/2001 | Son | |
| 6,297,601 | B1 | 10/2001 | Kang | |
| 6,323,880 | B1 | 11/2001 | Yamada | |
| 6,345,364 | B1 | 2/2002 | Lee | |
| 6,356,284 | B1 | 3/2002 | Manduley | |
| 6,362,835 | B1 | 3/2002 | Urbanus | |
| 6,366,291 | B1 | 4/2002 | Taniguchi | |
| 6,396,508 | B1 | 5/2002 | Noecker | |
| 6,396,520 | B1 | 5/2002 | Ording | |
| 6,408,293 | B1 | 6/2002 | Aggarwal | |
| 6,411,306 | B1 | 6/2002 | Miller | |
| 6,411,953 | B1 | 6/2002 | Ganapathy | |
| 6,414,675 | B1 | 7/2002 | Shen | |
| 6,452,610 | B1 | 9/2002 | Reinhardt | |
| 6,453,076 | B1 | 9/2002 | Nakajima | |
| 6,473,078 | B1 | 10/2002 | Ikonen | |
| 6,473,532 | B1 | 10/2002 | Sheraizin | |
| 6,496,165 | B1 | 12/2002 | Ide | |
| 6,529,212 | B2 | 3/2003 | Miller | |
| 6,552,736 | B2 | 4/2003 | Honda | |
| 6,587,087 | B1 | 7/2003 | Ishizuka | |
| 6,606,103 | B1 | 8/2003 | Hamlet | |
| 6,611,608 | B1 | 8/2003 | Wu | |
| 6,621,489 | B2 | 9/2003 | Yanagisawa | |
| 6,628,067 | B2 | 9/2003 | Kobayashi | |
| 6,657,634 | B1 | 12/2003 | Sinclair | |
| 6,661,029 | B1 | 12/2003 | Duggal | |
| 6,661,428 | B1 | 12/2003 | Kim | |
| 6,667,727 | B1 | 12/2003 | Iwaoka | |
| 6,677,924 | B2 | 1/2004 | Nakayama | |
| 6,677,936 | B2 | 1/2004 | Jacobsen | |
| 6,683,605 | B1 | 1/2004 | Bi | |
| 6,691,236 | B1 | 2/2004 | Atkinson | |
| 6,693,385 | B2 | 2/2004 | Koyama | |
| 6,701,263 | B2 | 3/2004 | Jeong | |
| 6,711,212 | B1 | 3/2004 | Lin | |
| 6,724,149 | B2 | 4/2004 | Komiya | |
| 6,724,151 | B2 | 4/2004 | Yoo | |
| 6,731,815 | B1 | 5/2004 | Hu | |
| 6,744,818 | B2 | 6/2004 | Sheraizin | |
| 6,762,741 | B2 | 7/2004 | Weindorf | |
| 6,768,520 | B1 | 7/2004 | Rilly | |
| 6,774,878 | B2 | 8/2004 | Yoshida | |
| 6,788,003 | B2 | 9/2004 | Inukai | |
| 6,788,822 | B1 * | 9/2004 | Zhang et al. | 382/254 |
| 6,791,566 | B1 | 9/2004 | Kuratomi | |
| 6,801,811 | B2 | 10/2004 | Ranganathan | |
| 6,809,706 | B2 | 10/2004 | Shimoda | |
| 6,812,650 | B2 | 11/2004 | Yasuda | |
| 6,816,135 | B2 | 11/2004 | Ide | |
| 6,819,036 | B2 | 11/2004 | Cok | |
| 6,822,631 | B1 | 11/2004 | Yatabe | |
| 6,829,005 | B2 | 12/2004 | Ferguson | |
| 6,839,048 | B2 | 1/2005 | Park | |
| 7,432,897 | B2 | 1/2005 | Nishitani | |
| 6,850,214 | B2 | 2/2005 | Nishitani | |
| 7,460,103 | B2 | 2/2005 | Konno | |
| 6,938,176 | B1 | 8/2005 | Alben | |
| 7,012,588 | B2 | 3/2006 | Siwinski | |
| 7,114,086 | B2 | 9/2006 | Mizuyabu et al. | |
| 7,463,235 | B2 | 12/2008 | Hiyama | |
| 2001/0032321 | A1 | 10/2001 | Nanno et al. | |
| 2001/0033260 | A1 | 10/2001 | Nishitani | |
| 2002/0063671 | A1 | 5/2002 | Knapp | |
| 2003/0001815 | A1 | 1/2003 | Cui | |
| 2003/0071805 | A1 | 4/2003 | Stanley | |
| 2003/0126232 | A1 | 7/2003 | Mogul | |
| 2003/0135288 | A1 | 7/2003 | Ranganathan | |
| 2003/0156074 | A1 | 8/2003 | Ranganathan | |
| 2003/0201969 | A1 | 10/2003 | Hiyama | |
| 2004/0041780 | A1 | 3/2004 | Ko | |
| 2004/0160435 | A1 | 8/2004 | Cui et al. | |
| 2005/0052446 | A1 | 3/2005 | Plut | |
| 2005/0057484 | A1 | 3/2005 | Diefenbaugh et al. | |
| 2005/0057485 | A1 | 3/2005 | Diefenbaugh | |
| 2005/0068289 | A1 | 3/2005 | Diefenbaugh et al. | |
| 2005/0068332 | A1 | 3/2005 | Diefenbaugh et al. | |
| 2005/0110717 | A1 | 5/2005 | Iwamura | |
| 2005/0134547 | A1 | 6/2005 | Wyatt | |
| 2005/0270265 | A1 | 12/2005 | Plut | |
| 2005/0270283 | A1 * | 12/2005 | Plut | 345/211 |
| 2005/0289363 | A1 | 12/2005 | Tsirkel et al. | |
| 2006/0001641 | A1 | 1/2006 | Degwekar et al. | |
| 2006/0001658 | A1 | 1/2006 | Plut | |
| 2006/0001659 | A1 | 1/2006 | Plut | |
| 2006/0001660 | A1 | 1/2006 | Plut | |
| 2006/0020906 | A1 | 1/2006 | Plut | |
| 2006/0071899 | A1 | 4/2006 | Chang | |
| 2006/0092182 | A1 | 5/2006 | Diefenbaugh et al. | |
| 2006/0125745 | A1 | 6/2006 | Evanicky | |
| 2006/0132474 | A1 | 6/2006 | Lam | |
| 2006/0146003 | A1 | 7/2006 | Diefenbaugh et al. | |
| 2006/0146056 | A1 | 7/2006 | Wyatt | |
| 2006/0250385 | A1 | 11/2006 | Plut | |
| 2006/0250525 | A1 | 11/2006 | Plut | |
| 2007/0002035 | A1 | 1/2007 | Plut | |

OTHER PUBLICATIONS

Iyer et al., "Energy-adaptive Display Designs for Future Mobile Environments" Proceeding of ModiSys 2003: The First International Conference on Mobile Systems, Applications, and Services, San Francisco, CA, May 2003.
Office Action in U.S. Appl. No. 10/891,734 dated Jul. 17, 2007.
Office Action in U.S. Appl. No. 10/891,734 dated Feb. 6, 2008.
Office Action #1 in U.S. Appl. No. 11/157,112 dated May 14, 2008.
Office Action #1 in U.S. Appl. No. 11/157,217 dated May 15, 2008.
Office Action #1 in U.S. Appl. No. 11/122,314 dated Apr. 17, 2008.
Office Action #1 in U.S. Appl. No. 11/122,313 dated Jun. 26, 2008.
Office Action #1 in U.S. Appl. No. 11/157,219 dated Aug. 13, 2008.
Office Action #3 in U.S. Appl. No. 10/891,734 dated Oct. 7, 2008.
Office Action #1 in U.S. Appl. No. 11/157,210 dated Jul. 10, 2008.
Office Action #2 in U.S. Appl. No. 11/122,313 dated Mar. 4, 2009.
Office Action #2 in U.S. Appl. No. 11/157,112 dated Dec. 29, 2008.
Office Action #2 in U.S. Appl. No. 11/157,210 dated Jul. 10, 2008.
Office Action #2 in U.S. Appl. No. 11/122,314 dated Oct. 29, 2008.
Hardening Windows Systems 2000, System Experts 2001, Philip Cox et al.

* cited by examiner

HISTOGRAM AND SPATIAL-BASED POWER SAVINGS

CROSS-REFERENCE TO RELATED APPLICATION

This application is a continuation application and claims priority under 35 U.S.C. §120 from commonly-owned and co-pending U.S. patent application Ser. No. 10/891,734, filed Jul. 15, 2004 and titled "SPATIAL-BASED POWER SAVINGS", which claimed priority under 35 U.S.C. §119(e) from U.S. Provisional Patent Application No. 60/487,761 filed on Jul. 16, 2003; each of these applications is incorporated herein by reference for all purposes.

BACKGROUND OF THE INVENTION

This invention relates to systems and methods for reducing power consumed by an electronics device that includes a display. More particularly, the present invention relates to spatial-based techniques for conserving power based on inactive portions of a display area.

Video output for a desktop or laptop computer typically consumes between 70 and 95 percent of the computer's power budget. Other electronics devices such as handheld portable computing devices and MP3 players include similarly large video consumption rates.

Currently, power conservation techniques alter an entire image at once, such as shutting down a computer after some predetermined time or applying some other 'sleep' or 'hibernate' mode that turns off all video output for an entire display area.

Many consumers equate antiquated screen savers directed to preventing screen burn-in with a power conservation tool. Screen burn-in, a phenomenon associated with cathode ray tube (CRT) devices, occurs when phosphors on an internal surface of a CRT screen deteriorate over time due to the frequent presence of currents required for creating visual output. Parts of a CRT screen that continually receive fewer video images will not experience as much burn-in as parts that receive more frequent output. Eventually, a noticeable difference grows in a CRT screen between regions of high activity and regions of low activity. Screen savers were thus historically developed for CRT display devices to prevent screen burn-in from accumulating.

In computer operation, a graphics control initiates the screen saver after some predetermined time and replaces computer video content across the entire screen with new and different screen saver video content. Screen savers only reduce power consumption when the energy required for the screen saver video is less than the energy required for the computer content previously displayed. Many screen savers, such as picture slide shows, may consume more energy than the previous video content. In addition, graphics-based user interfaces run a screen saver across an entire screen. These rules intend to protect CRT life, regardless of power consumption.

Based on the foregoing, it should be apparent that improved power conservation techniques would be desirable.

SUMMARY OF THE INVENTION

The present invention provides systems and methods that reduce power consumption for an electronics device that includes a display. The power conservation systems and methods alter video information in one or more portions of a display area such that the alteration decreases power consumption.

In one aspect, the present invention relates to a method for reducing power consumed by a display device. The method comprises displaying an active graphics component in a first portion of a display area provided by the display device. The method also comprises altering video information in an inactive portion of the display area that is outside the first portion in response to user inactivity in the inactive portion. The video information is altered such that the display device will consume less power when displaying the altered video information than an amount of power that would be required to display the video information without the alteration. The method further comprises simultaneously displaying the active graphics component in the first portion and the altered video information in the inactive portion.

In a luminance reduction aspect, the present invention relates to a method for reducing power consumed by a display device. The method comprises displaying an active graphics component in a first portion of a display area provided by the display device. The method also comprises reducing luminance for a set of pixels in an inactive portion of the display area that is outside the first portion in response to user inactivity in the inactive portion. The luminance is reduced such that the display device will consume less power when displaying the reduced luminance video information than an amount of power that would be required to display the video information without the luminance reduction. The method further comprises simultaneously displaying the active graphics component in the first portion and the reduced luminance video information in the inactive portion.

In another aspect, the present invention relates to a computer readable medium including instructions for reducing power consumed by a display device. The computer-readable medium comprises instructions for displaying an active graphics component in a first portion of a display area provided by the display device. The computer-readable medium also comprises instructions for altering, in response to user inactivity in an inactive portion of the display area that is outside the first portion, video information in the inactive portion. The video information is altered such that the display device will consume less power when displaying the altered video information than an amount of power that would be required to display the video information without the alteration. The computer-readable medium further comprises instructions for simultaneously displaying the active graphics component in the first portion and the altered video information in the inactive portion.

In yet another aspect, the present invention relates to a system for reducing power consumed by a display device. The system comprises a monitoring apparatus designed or configured to monitor user activity in a display area for the display device and separate the display area into an active portion based on user activity in the active portion and an inactive portion that is outside the active portion. The system also comprises a power conservation apparatus designed or configured to receive user activity information produced by the monitoring apparatus, to alter video information in the inactive portion such that the display device will consume less power when displaying the altered video information than an amount of power that would be required to display the video information without the alteration, and to output the altered video information.

In still another aspect, the present invention relates to a system for reducing power consumed by a display device. The system comprises a monitoring apparatus designed or configured to monitor user activity in a display area for the display device and separate the display area into an active portion based on user activity in the active portion and an inactive portion that is outside the active portion. The system also comprises a power conservation apparatus designed or configured to receive user activity information produced by the monitoring apparatus, to alter video information in the inactive portion such that the display device will consume less power when displaying the altered video information than an amount of power that would be required to display the video information without the alteration, and to output the altered video information. The system further comprises at least one display buffer designed or configured to receive the altered video information and output, to the display device, a) active portion video information for display in the active portion of the display area, and b) the altered video information for display in the inactive portion, which is for display while the active portion video information is displayed.

In yet another power conservation aspect, the present invention relates to a system for reducing power consumed by a display device. The system comprises a monitoring apparatus designed or configured to monitor user activity in a display area for the display device and to separate the display area into an active portion based on user activity in the active portion and an inactive portion that is outside the active portion. The system also comprises a power conservation control designed or configured to receive user activity information provided by the monitoring apparatus, determine a alteration for the video information in the inactive portion such that the display device will consume less power when displaying the altered video information than an amount of power that would be required to display the video information without the alteration, and output a signal indicative of the alteration. The system further comprises a video adaptor designed or configured to receive the signal from the power conservation control, to alter the video information in the inactive portion based on the signal, and to output the altered video information. The system additionally comprises at least one display buffer configured to receive the altered video information and output, to the display device, a) active portion video information for display in the active portion of the display area, and b) the altered video information for display in the inactive portion, which is for display while the active portion video information is displayed.

These and other features of the present invention will be presented in more detail in the following detailed description of the invention and the associated figures.

Before committing to the Detailed Description, it may facilitate understanding to clarify certain words and phrases used in this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Support and definitions for certain words and phrases are provided throughout this patent document, and those of ordinary skill in the art should understand that in many, if not most instances, such support applies to prior, as well as future uses of such words and phrases.

DESCRIPTION OF THE PREFERRED EMBODIMENTS

Figure 1A:
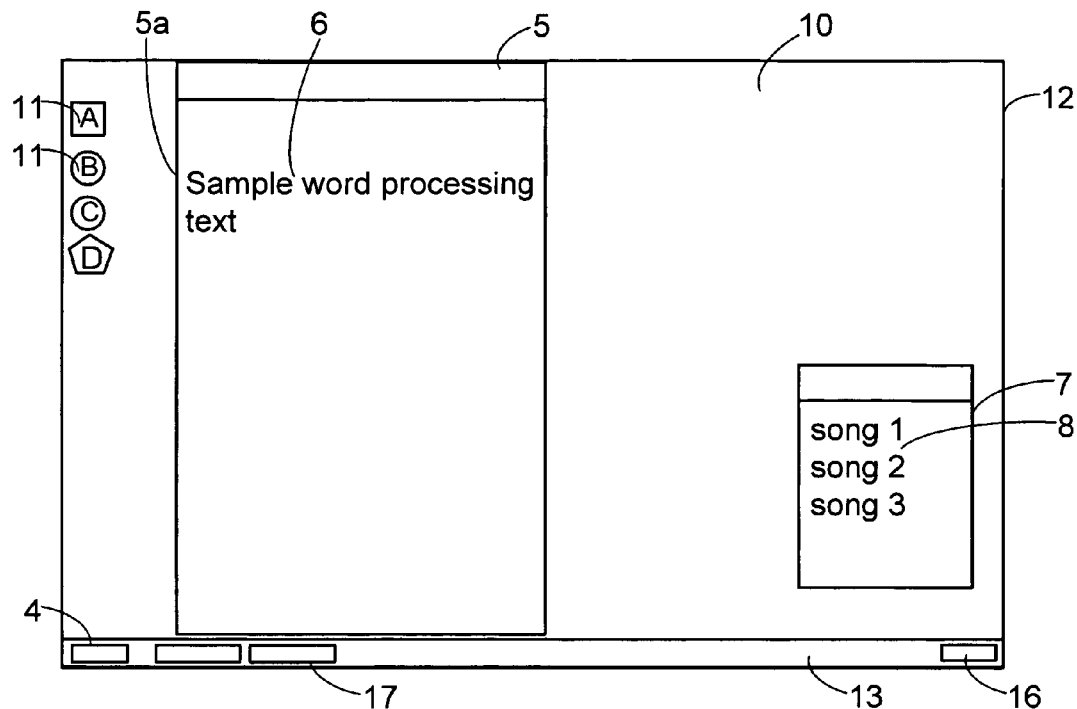
FIG. 1A illustrates two graphics components and a background in accordance with one embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In one aspect, the present invention reduces power consumption based on usage distribution across a display area. In this case, the display area is divided into active and inactive portions. For example, a display area presented by a display device may be divided into three or four graphics components, each related to an individual program running on the computer. While one graphics component program—such as a word processing file—is active and used, video information for the other inactive graphics components and inactive portions of the display area is altered to decrease power consumption for the inactive portions.

Altering video information to reduce power consumption may comprise decreasing the brightness and luminance for inactive video information, altering color for inactive video information, and turning inactive video information to black, for example. Power conservation system designers and/or users may also vary the rate of inactive video information change and/or set a lower limit for alterations and video information presentation.

In another embodiment, the present invention alters different inactive portions at different rates and to varying extents. For example, video information in a background may be altered at a slower rate and less aggressively than alterations to one or more graphics components (or vice versa).

Video information within a single inactive graphics component may also be altered separately. For example, a window that outputs video information for a drawing program may include a border portion and a main work area, which usually displays a white backing that will consume maximal power when displayed. The border portion allows a user to identify the window based on shape detection (and a color if the border has a characteristic color), and may include a text line that designates the program name or file currently open. In one embodiment, the present invention decreases luminance for video information in the main work area greater than video information in the border portion. This maintains the ability to identify an inactive graphics component and associated program based on shape and name, while reducing the majority of power required to display the inactive graphics component.

The present invention finds use with portable computing devices powered from a battery or other limited source of power. Since video output often dominates the portable device's power consumption, decreasing video power consumption extends battery longevity for the device.

The present invention also finds use with display devices having a large display area size relative to an active graphics component size. For example, laptop computers with 15-17" display areas, measured diagonally, are now common. Some programs, such as music player programs, occupy less than 20% of the display area. Conventional video output protocol displays the entire display area—at full power—when using the smaller graphics component—even though only a small portion of the display area is in use. The present invention however may decrease power consumption from inactive portions of the display area and thereby save power. In some cases, spatial-based power conservation techniques described herein may reduce power consumption for an electronics device by up to 50%, and even more in some applications.

FIG. 1A illustrates two graphics components 5 and 7 and a background 10 in accordance with one embodiment of the present invention. While the present invention will now be described as graphics systems and components useful for reducing power consumption, those skilled in the art will recognize that the subsequent description with respect to FIGS. 1A-1E may also illustrate methods and discrete actions for reducing power consumption for a display device and electronics device.

An electronics device, such as a desktop, laptop or handheld computer, runs graphics-based user interface 4 and operates a display device for visual output. Graphics-based user interface 4 facilitates interaction between a user and computing device and/or between the user and one or more computer programs run on the computer. Graphics components 5 and 7 and background 10 are intended for use with interface 4. Graphics-based user interface 4 employs the display device to output video information for graphics components 5 and 7 and background 10. Graphics-based user interface 4 also allows user input within background 10 and within each graphics component 5 and 7.

Graphics components 5 and 7 are each for display as discrete visual objects and output video information related to a program running on the computer. Common programs include word processing programs, file navigation displays, Internet Browsers, drawing programs, music player programs, and video games, for example. Rectangular windows are common and vary in size from a maximum size that roughly spans a display area 12 to smaller sizes within display area 12. Graphics components 5 and 7 may each include their own bitmap comprising an array of pixel values. For FIG. 1A, graphics component 5 is a window that comprises word processing video output 6. Graphics component 7 is a window that comprises music player program video output 8.

Background 10 represents a backdrop graphics component for graphics-based user interface 4. In one embodiment, a perimeter of background 10 determines an allowable usable area for graphics-based user interface 4. The usable area defines visual output limits, defines user input limits for interface 4, and defines other related background functions. For example, dimensions for background 10 establish spatial locations for background graphics components such as icons 11 and control bar 13.

Display area 12 refers to the total image size of a display device. Pixel dimensions may characterize the size of display area 12. Maximal linear dimensions that span an image produced by the display device may also characterize the size of display area 12. For a liquid crystal display (LCD), an organic light emitting diode (OLED) device or a projector, display area 12 may be characterized using the maximum pixel dimensions for an optical modulator producing the image. Thus, resolution for a projector's optical modulation device (e.g., DMD) quantifies the display area 12 size. Linear dimensions for display area 12 output by a projector will vary with the distance between the receiving surface and projector output lens and a splay angle for the projector. The linear dimensions may be measured on the projected image, usually after any keystone distortion has been suitably corrected for.

Figure 1B:
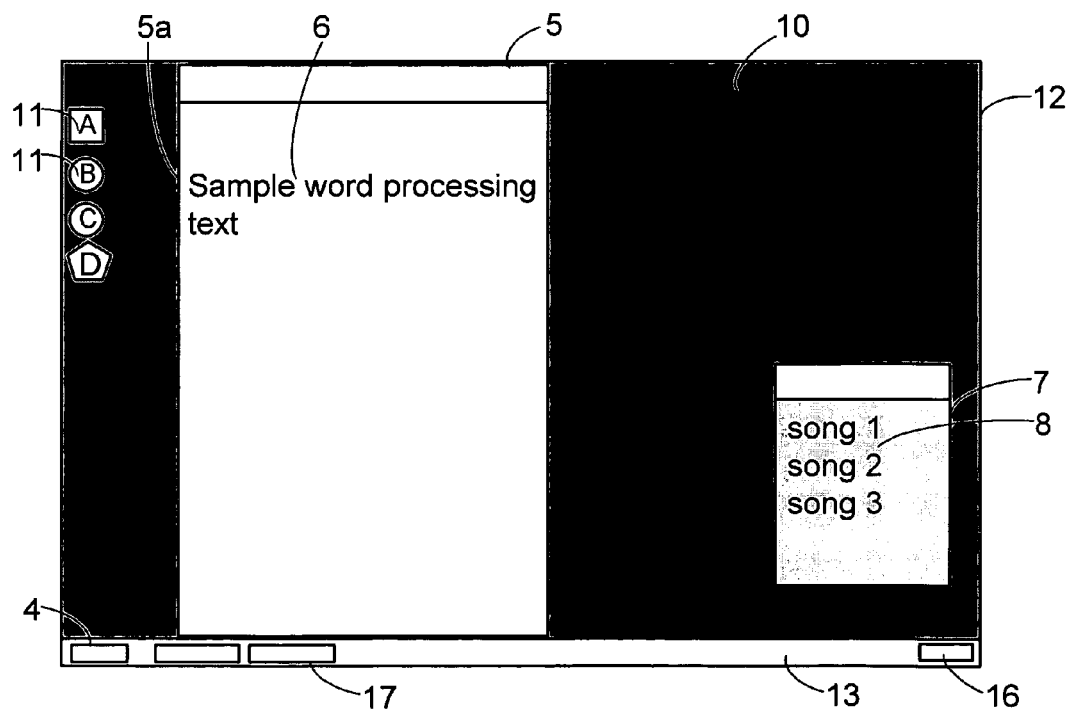
FIG. 1B illustrates alteration to a background and a second graphics component of FIG. 1A as a result of inactivity outside an active graphics component in accordance with one embodiment of the present invention.

FIG. 1B illustrates an altered background 10 and graphics component 7 as a result of inactivity outside an active graphics component 5 in accordance with one embodiment of the present invention. User activity in this case with graphics-based user interface 4 comprises continued interaction within the boundary 5a of graphics component 5, such as typing and/or pointer positioning within the window boundary 5a.

The present invention alters video information outside an active graphics component such that a display device outputting the video information requires less power than an amount of power required without alteration. An active graphics component implies activity (or interaction) between the graphics component and a user. Activity may comprise a) user input within a perimeter or outer boundary for the graphics component—as determined by a program associated with the graphics component, and/or b) program output to the user—as determined by the program. The perimeter of an active graphics component also defines an active portion inside the perimeter and inactive portion outside the perimeter for video alteration as described herein. Inactive portions may also be differentiated for video alteration within a single graphics component, as will be described below.

Activity that qualifies as active are related to a program associated with the graphics component, and may vary with power conservation system design. For example, user input and activity for a word processing program running on graphics component 5 may include: typing within window boundary 5a, positioning a pointer within window boundary 5a, clicking a button (e.g., using a mouse) within window boundary 5a, manipulating menus and scrollbars within window boundary 5a, a subset of these chosen by design, etc. User input for a music player program running on graphics component 7 may include selecting songs to be played or manipulating volume and other audio output features. Video output for the music player program may include temporally-varying video that changes with the music based on program operation—without regular user input—such as an equalizer output or a clock that counts music time as a song plays. In one embodiment of the present invention, the music player program maintains an active graphics components status as a result of the temporally-varying video output. In another embodiment, the power conservation system is designed such that temporally-varying video output for the music player program does not qualify as activity and graphics component 7 becomes inactive without any user input or activity. User input for an Internet browser window may include positioning a pointer within the window, typing addresses, and opening links, for example. In one embodiment, activity comprises temporally-varying video output provided by a program whose video output intentionally varies over time without continued user input, such as a movie player. Video output is also common with Internet browsers and may or may not constitute interaction based on power conservation system design. User input for background 10 includes moving a pointer within background 10, selecting ('clicking' or 'double clicking') an icon 11, accessing individual items on control bar 13, etc.

Inactivity outside the active graphics component implies a lack of interaction in the inactive portion. As activity described above depends on a program associated with the graphics component, so does inactivity. In one embodiment, inactivity is defined for an individual graphics component according to a lack of activity for the graphics component, which will depend on the program associated with the graphics component. Thus, inactivity for word processing graphics component 5 includes a lack of typing within the window boundary, a lack of positioning a pointer within the window boundary, a lack of manipulating menus and scrollbars within the window boundary, etc. Inactivity for background 10 may include a lack of positioning a pointer within the background 10 perimeter, a lack of initiating icons and menus, etc. In one embodiment, the present invention discriminates inactivity between background 10 and individual graphics components outside the active graphics component.

Graphics-based user interface 4 of FIG. 1B uses a threshold inactivity time to determine when alterations to video information outside of active graphics component 5 begin. The threshold inactivity time also determines when power conservation begins. Graphics-based user interface 4 may alternately alter video information immediately with inactivity, as described below with respect to FIG. 1C. A user may set the threshold inactivity time via a graphics control such as that described in FIG. 4. Once the threshold inactivity time has been reached, output power for the display device decreases according to one or more video manipulation techniques.

In one embodiment, after the threshold inactivity time, video alterations and power conservation may continue at set power reduction intervals. The power reduction intervals determine specific times after the threshold inactivity time at which further video alterations are applied. This allows the video information to gradually change—and power conservation to gradually increase—over time and according to varying design or user preference. A user may set the power reduction intervals using a graphics control, such as that described below. In order for a power reduction interval to be met, inactivity continues within the inactive graphics component or inactive portion for the duration of the interval. It is understood that the threshold inactivity time and power reduction intervals are a matter of system design and user choice and may be different time periods.

Once the threshold inactivity time has past, the present invention alters video information outside an active graphics component such that a display device will consume less power than that which would be required without alteration. In addition, video information outside the active graphics component may continue to adapt as time proceeds to further reduce power consumption. An array of video manipulation techniques may be employed by the present invention to reduce power consumption. Some techniques manipulate the luminance levels of pixels in an inactive portion to reduce power consumption.

Human vision employs a number of information reduction mechanisms to reduce the amount of visual information in an environment to a manageable level. Such mechanisms include shape detection and foreground/background separation. Foreground/background separation divides an environment to into a foreground where more information is processed (e.g. more detail) and a background where less information is processed (e.g. less detail). Shape detection allows a person to recognize objects based on reduced information, such as outer contours that resemble a shape for the object. In one embodiment, the present invention leverages these information reduction mechanisms to reduce the amount of video information displayed outside an active graphics component and to reduce power consumption for the display device.

In a specific embodiment, the present invention reduces the amount of visual information in an inactive portion. This technique leverages the foreground/background visual processing mechanism in humans. Since an individual processes less information in a background visual region, reducing video output in an inactive portion may not sacrifice perceived video quality for an active task or graphics component. In some embodiments, the inactive video information is altered while minimizing any compromises for a person to subsequently locate and identify an inactive graphics components, e.g., using shape detection or color.

Power conservation as shown in FIG. 1B reduces luminance for video information in an inactive portion outside of graphics component 5. In one embodiment, the present invention reduces the luminance for all pixels in the inactive portion by the same amount. In other words, the entire inactive portion becomes darker by subtracting a constant value from the luminance value for each pixel in the inactive portion. This effectively shifts a luminance histogram for the inactive video information to a darker state. Such a luminance reduction may be implemented at a threshold inactivity time and at each power reduction interval. The constant value may include a function of i) a maximum luminance for the inactive portion (such as a percentage), ii) a maximum luminance provided by the display device, iii) a mean, median or mode of luminance values for an inactive portion (e.g., background 10 or graphics component 7), or iv) a mean, median or mode of a luminance range values provided by the display device, etc. A suitable percentage of the maximum luminance for the inactive portion may range from about 2 percent to about 100 percent of the maximum luminance. A suitable percentage of the maximum luminance for the display device may range from about 2 percent to about 100 percent of the maximum luminance provided by the display device. Thus, a 100 percent reduction turns the entire inactive portion black at the threshold inactivity time and maximizes energy conservation. A 5 percent luminance reduction at the threshold inactivity time and each power reduction interval thereafter steadily decreases luminance over time. Values less than 1 percent may be used for subtle and/or high frequency changes. While saving less power than a full 100 percent reduction, smaller alterations may be preferable to some users who prefer a less dramatic visual change in the inactive portions. It is also understood that the percentage reduction at the threshold activity time and each power reduction interval may be different levels. For example, a 5 percent luminance reduction may be implemented at the threshold inactivity time, while a 2 percent, 10 percent, or escalating (0.25, 0.5, 1, 2, 4, 6, 8, 10 percent, etc.) reduction may be used at each power reduction interval.

Graphics component 7 of FIG. 1B is illustrated after about 9½ minutes of inactivity within graphics component 7. In a specific embodiment, graphics component 7 includes a threshold inactivity time of 5 minutes and power reduction intervals of 1 minute. The luminance decrease is about 10 percent of the maximum luminance provided by the display device for both the threshold inactivity time and at each subsequent luminance reduction interval. Thus, after about 9½ minutes of inactivity within graphics component 7, the luminance reduction is about 40 percent. After 14 minutes, the luminance for all pixels and video information within graphics component 7 will be zero and the visual output for graphics component 7 will be black.

In one aspect, the present invention builds a histogram for a set of pixels and reduces power consumption for the pixels using one or more histogram-manipulation techniques. The histogram describes the frequency of pixel values (e.g., luminance or chroma) for a graphics component or background. One embodiment alters pixel values in an inactive portion by compressing and shifting a luminance histogram. More specifically, a luminance histogram is first constructed for a set of pixels in the inactive portion, such as background 10. The luminance histogram is then compressed, e.g., about the mean, median or mode. A shift subsequently reduces the luminance values for all pixels in the compressed set by a constant. One suitable constant is a number that gives a pixel with the lowest luminance value in the new compressed histogram a zero luminance. The inactive portion becomes darker since the final histogram luminance varies from zero luminance to a new maximum luminance produced as a result of the compression and shift.

Figure 1C:
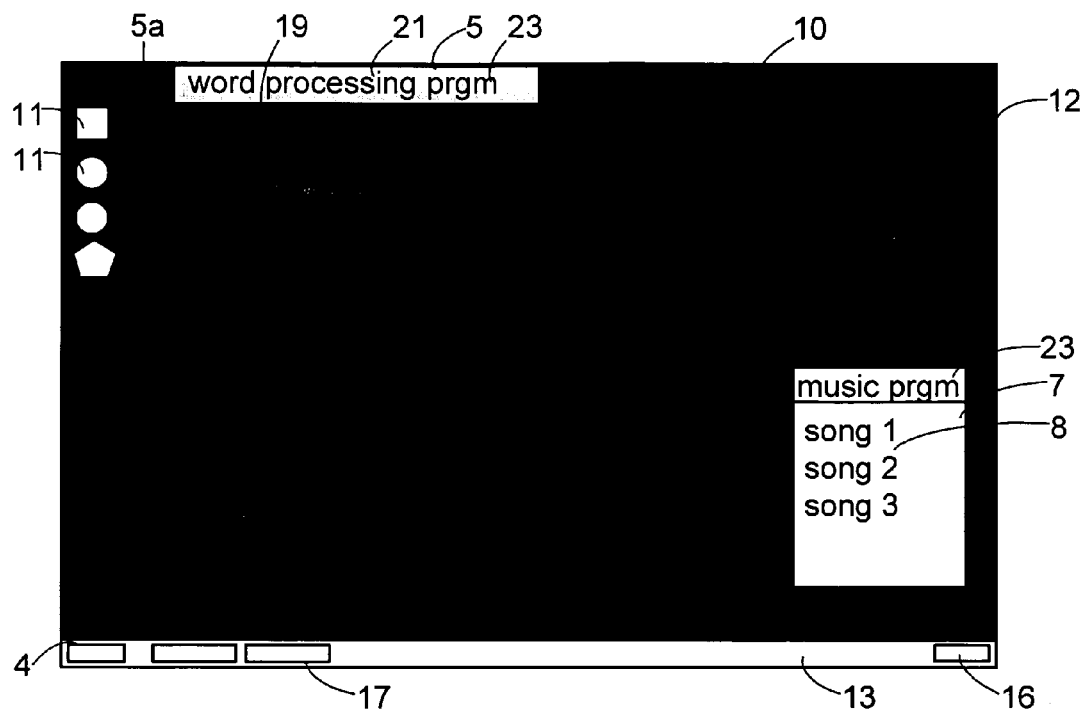
FIG. 1C illustrates alteration to the other graphics component of FIG. 1A as a result of inactivity outside the second graphics component in accordance with one embodiment of the present invention.
Figure 1D:
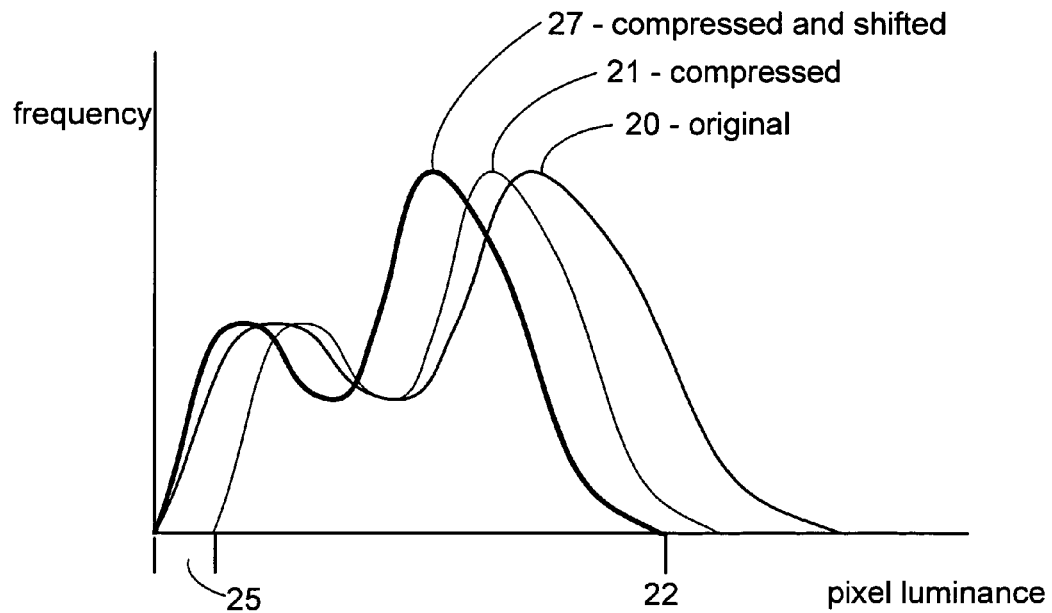
FIG. 1D shows an exemplary histogram and altered video information for background of FIG. 1A.

FIG. 1D shows an exemplary histogram 20 for background 10 of FIG. 1B. As shown, histogram 20 is compressed by 20 percent: 10 percent on the low end 10 percent on the high end. After the compression, all pixel luminance values in the compressed histogram 21 are decreased by a luminance difference 25 between a lowest luminance value for compressed histogram 21 and zero. A shifted and compressed histogram 27 results from the two operations and includes luminance values that vary from zero luminance to a new maximum luminance 22.

This combined compression and shift eliminates high luminance values for an inactive portion. Eliminating the high luminance pixels in an inactive portion decreases power for each individual pixel and cumulatively reduces power consumption for the inactive portion and entire display area. In addition, this combined compression and shift somewhat maintains relative luminance levels in the video information that existed before the alteration without turning specific portions to black.

A suitable amount of luminance compression may range from about 1 percent to about 50 percent of histogram luminance range for the inactive portion. Another suitable compression may range from about 5 percent to about 20 percent of histogram luminance range. Compression and shifting may occur at the threshold inactivity time and at each power reduction interval, if desired. This process may repeat at subsequent power reduction intervals until the entire inactive portion is almost black or until a predetermined cutoff is reached. Suitable cutoffs include: when the maximum luminance value in the inactive portion reaches a predetermined minimum luminance, when the histogram reaches a minimum width, or when the difference between subsequent iterations is minimal.

The present invention may implement other compression and shift schemes. In one embodiment, the luminance histogram for a set of pixels is compressed only on one side, e.g., on the high end. If the histogram compression occurs just on the high end of luminance values, the inactive portion becomes darker for brighter pixels only. If the histogram compression occurs only on the low end of luminance values and then a shift is applied, the inactive portion becomes darker for all pixels.

Although the present invention has primarily been discussed so far with linear and simple reductions in luminance for pixel values in an inactive portion, a power conservation system designer may apply more complicated luminance reduction and power conservation schemes. The relationship between power reduction, video alterations, and time may be established according to system design. One suitable power conservation scheme applies stepwise reductions of predetermined values at predetermined times. Another power conservation scheme employs an exponential decrease in luminance values for pixels in an inactive portion as time proceeds. In this case, luminance reduction starts slowly in an initial time span, increases gradually in some midpoint time span, and then increases sharply in a later time span. A linear reduction based on $y=F(x^2)$, where y is the current luminance reduction, x represents the ith alteration in a number of alterations over time, and $F(x^2)$ is some function that increases power conservation as inactivity time passes or increases exponentially with a number of alterations to the video information. Linear constants and other mathematical operators may be inserted into the equation to alter video alterations as desired. Logic may also be applied in the video information manipulation to achieve a desired luminance vs. time curve.

Logic that limits further alterations to pixels in subsequent power reduction intervals before may also be implemented. One suitable logic applies a lower limit that values of individual pixels in the inactive portion may be reduced to, such as a percentage of an initial luminance or chroma level. For example, luminance reductions may cease for a pixel once they the pixel reaches from about 5 percent to about 50 percent of its initial level—regardless of how it reached this point.

In another embodiment, luminance reduction occurs gradually over time at smaller intermittent time intervals (e.g., less than a minute) and small luminance alterations, as opposed to larger and less frequent alterations. This technique provides a more gradual power reduction without sharp or noticeable changes in video content. For example, luminance in an inactive portion may decrease 1 percent every 10 seconds, thereby decreasing luminance by 60 percent over ten minutes without a large and obvious single change.

In one embodiment, alterations to video information include different rates and alterations for different inactive portions. Referring back to FIG. 1B, background 10 and graphics component 7 are altered at different rates and with different mechanisms. Background 10 includes a background threshold inactivity time of 2 minutes and power reduction intervals of 30 seconds. At each power reduction interval, the histogram for background 10 is compressed by 10 percent and shifted down by 5 percent. For the about 9½ minute snapshot illustrated in FIG. 1B, video information in background 10 has been reduced to about 18 percent of its original luminance span and now occupies the lowest 18 percent of its luminance values. After 10 minutes, a logical cutoff is implemented to further changes and the visual output for background 10 turns black. The logical cutoff is implemented to further changes may also keep video information in background 10 at a constant level, such as the level last altered to. In one embodiment, alterations to background 10 video information are designed to produce greater power conservation than alterations to video information for a graphics component. This power conservation difference incorporates size, video information, and alteration rate variations between a background 10 and any graphics component.

An active portion of display area 12 includes any area in display area 12 employed by an active graphics component or active program. Spatial limits for a graphics component are typically defined by a perimeter according to video information in a bitmap for the graphics component. Such spatial description is usually defined by the graphics-based user interface 4 and known to those of skill in the art. An inactive portion of display area 12 then includes any area in display area 12 outside an active graphics component or active program. Although FIG. 1B shows graphics components 5 and 7 as distant structures, it is understood that graphics components may overlap. For example, graphics component 5 may overlap graphics component 7, or vice versa. In addition, multiple inactive graphics components may overlap. Either active graphics component 5 or 7 also overlaps background 10. Regardless of the geometric relation of active and inactive graphics components and associated video information, the present invention applies the power conservation techniques described herein to any visible inactive portions and video information. This includes updating changes to background 10 when a user drags a graphics component within background 10 to expose previously covered portions.

An inactive portion returns—or reactivates—to its original state from an altered state after an explicit user activity in the inactive portion, or after some activity in the program designated as active by a power conservation program designer. Reactivation displays the video information as it was initially displayed before any alterations. In a specific embodiment, positioning a pointer onto an area of background 10 triggers reactivation and returns background 10 to full luminance. Similarly, graphics component 7 reactivates by positioning a pointer within the perimeter of graphics component 7 and/or clicking a button within the perimeter. Reactivation may also include initiating graphics component 7 via its corresponding toggle 17 on control bar 13, which in this case may occur without pointer travel through background 10. Power conservation system designers may also customize reactivation rules. For example, reactivation may be designed such that solely positioning and moving a pointer within a graphics component or background such as a window does not satisfy reactivation criteria. In this case, reactivation may be satisfied by clicking a button on a mouse while the pointer is within the window, or another explicit action within the graphics component.

In another embodiment, inactivity within an active window and the display area may be monitored and timed. Graphics-based user interface 4 includes a global power saving tool that initiates after a predetermined time of inactivity throughout the entire display area 12. In this case, the global power saving tool turns off video display for the entire display area 12 when inactivity within the currently active portion reaches the global power saving tool time limit, e.g., such as 15 minutes.

FIG. 1C illustrates an alteration to graphics component 5 and background 10 as a result of inactivity outside an active graphics component 7 in accordance with another embodiment of the present invention. User interface in this case with graphics-based user interface 4 comprises continued activity within the boundary of graphics component 7.

The present invention advantageously allows a user to access a music player program within graphics component 7—which may constitute a relatively small proportion of display area 12—while reducing video output and power consumption from the rest of display area 12. In contrast, conventional protocol and display devices that singularly display a music player program without the present invention would require the entire display area to be active and consume power. For larger display areas, displaying only graphics component 7 and not the remainder of display area 12 may contribute to up to a 75% reduction in power consumption, which is particularly valuable when the display device is powered by a battery in a portable computer.

In a specific embodiment, video information outside graphics component 7 alters immediately upon inactivity outside graphics component 7. In this case, luminance for an entire inactive portion—including background 10 and graphics component 5—decreases gradually as time proceeds. One suitable luminance reduction scheme decreases luminance incrementally and alters the video information at power reduction intervals that begin immediately upon user inactivity and have a frequency of greater than about 1 hertz, such as every 50 milliseconds. In this case, the incremental reductions decrease luminance by a tiny amount each time such that any individual alteration is barely noticeable to a user. Cumulatively however, the incremental alterations may accumulate to produce a significant change, such as a 50 percent reduction in luminance for background 10 and graphics component 7 over five minutes for example. The gradual rate of luminance reduction may be established according to power conservation system design or user preference, and advantageously allows inactive portions to alter without a substantially noticeable stepwise changes. A magnitude for each incremental alteration may be determined by dividing a desired total alteration over a period of time by the number of intervals in the time period.

Figure 1E:
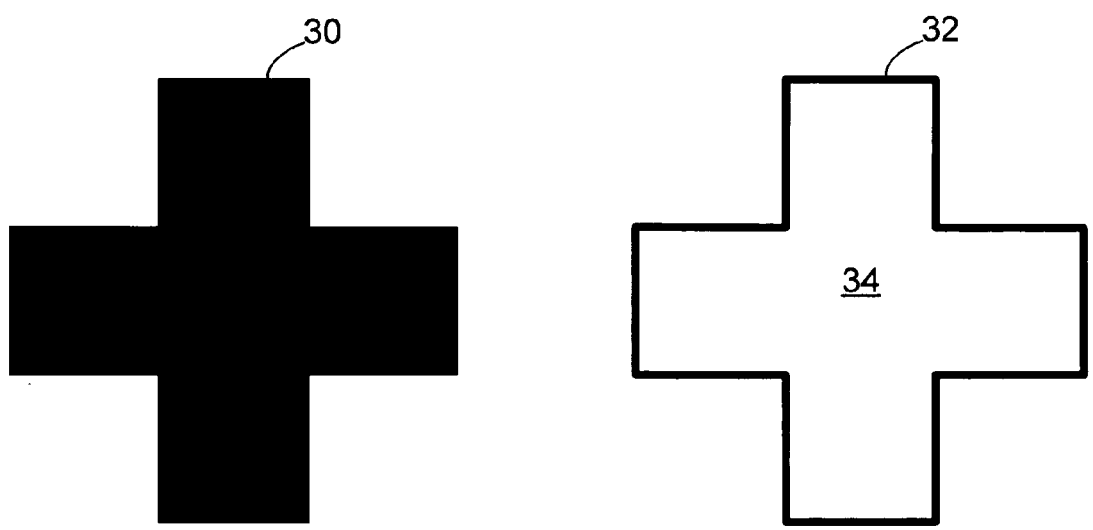
FIG. 1E illustrates a visual information reduction mechanism employed by the human vision system that allows a person to recognize objects based on shape.

The present invention may also discriminate what video information is altered. In one embodiment, alterations to video information outside active graphics component 7 modify video information for a graphics component based on whether the information is useful for shape discrimination and identification of the graphics component. In this case, video information outside graphics component 7 is altered such that video information useful for shape detection of inactive graphics component 5 is altered less than video information not significantly useful for shape detection of inactive graphics component 5. In some cases, the video information useful for shape detection of inactive graphics component 5 is not altered at all. As described above, shape detection is a visual information reduction mechanism employed by the human vision system that allows a person to recognize objects and graphics components based on reduced information—namely, the shape of the object or graphics component. FIG. 1E illustrates this mechanism for a simple cross 30. As shown, a person's visual system processes an edge pattern 32, while disregarding information in internal portion 34. This reduces the amount of information processed by the person. The present invention may leverage this human processing scheme to reduce the amount of power output by display device without sacrificing the ability for a user to identify and locate inactive graphics components outside an active portion.

Graphics component 5 may be spatially characterized and recognized by its border shape 5a. As highlighted in FIG. 1C, graphics component 5 comprises an internal portion 19 within a border portion 21, which characteristically resembles the shape of the rectangular word processing window. Internal portion 19, which mainly comprises text for a word processing window, includes video information not generally required for shape detection of the window. As shown, internal portion 19 is heavily reduced in luminance, while border portion 21 is altered less. This allows a user to identify the graphics component 5 based on shape detection and to detect the presence and position of graphics component 5 using border portion 21, while heavily reducing video output and power consumption for the internal portion 19. Since internal portion 19 may constitute over 90 percent of the area for graphics component 5, and often includes a white background that uses considerable power, luminance reduction in this case may significantly increase power conservation while maintaining user recognition.

In one embodiment, alterations according to the present invention may consider chroma values. Detection of an inactive graphics component 5 may be enhanced using the preservation of characteristic color information for a program displayed by the graphics component. Correspondingly, power conservation and/or recognition of key features may be enhanced using color. Referring back to FIG. 1C, the graphics-based user interface may user a characteristic color for border portion 21 of graphics component 5 such as those used with word processing programs and file navigation displays. If the characteristic color is blue for example, then video information in internal portion 19 may be reduced in color to reduce power, while the color in border portion 21 may be altered less and preserved to permit quick color-based recognition of graphics component 5 and its spatial limits.

In many graphics-based user interface designs, graphics component 5 includes text 23 within a border portion 21 that identifies graphics component 5. For a word processing window for example, text 23 may include a specific file name and the program name. For a music player program, text 23 may include the player program name. For a file navigation display, text 23 may include the current file or directory. In one embodiment, the present invention alters border portion 21 less and maintains more detail such that the text remains visible. This shape and border discrimination technique allows a user to scan an altered display area 12, read text 23, and identify graphics component 5 amongst a number of similar word processing windows without a need for reactivating the entire display area 12.

In one embodiment, video information and inactive portions within background 10 are delineated as separate portions and are altered with different rates and mechanisms than a main portion of background 10. As shown, control bar 13 and any toggles included therein do not decrease in luminance over time. Since control bar 13 represents a relatively small portion of display area 12, and a likely place for subsequent user interaction outside of the currently active graphics component 5, power conservation may be sacrificed for an expected demand of control bar 13 usage. Icons 11 and clock 16 may also be left unaltered or less altered according to power conservation system design.

In a specific embodiment, the present invention alters video information for icons 11 such that border portions for each icon are subsequently illustrated with increased video information and salience than internal portions of each icon. This allows icons 11 to be recognized based on the shape or color without requiring full video output from each icon.

To facilitate shape detection based information alteration and power conservation as described above, the present invention may also employ one or more automated edge detection techniques for graphics components that do not readily include characteristic perimeter information in their bitmap. The edge detection techniques are used to build a perimeter or shape based on video information included in the graphics component bitmap. The perimeter information may also be used to define spatial limits for active and inactive delineation. In this case, a shape detection tool probes video information in an image file according to one or more edge detection, contour tracing and shape measurement techniques and constructs perimeter information for the graphics component. Some common edge detection techniques include a Robert's Gradient, Sobel masks, Prewitt masks, Kirsh masks, LaPlacian filters, isotropic border extractions, etc. Edge detection techniques are known to those of skill in the art and not detailed herein for sake of brevity. After edge detection is complete, the present invention may then alter video information for the graphics component based on the results of the edge detection.

According to common graphics-based user interface protocol, a graphics component that does not fill the entire display area may be moved within display area 12. Many graphics-based user interfaces include 'click and drag' functionality that allows a user to reposition graphics component such as a window by moving an on-screen pointer or manipulanda to an edge of the window, pressing a key, and repositioning the window while the button is pressed. In one embodiment, repositioning graphics component 7 does not activate inactive graphics components including background 10 or graphics component 5, and as described above, causes previously hidden video information to appear at the alteration state currently occupied by the background. In another embodiment, repositioning a graphics component activates the background and all other graphics components.

Although the present invention has been described so far with respect to alterations in video information and power conservation according to luminance alterations as might be applied in a hue/saturation/luminance (HSL) color scheme, one of skill in the art will appreciate that the alterations described herein may apply to black and white video output and color video output; and apply regardless of the color scheme employed by a color video output graphics-based user interface, video controller or display device. An HSL color scheme characterizes video output according to a wavelength or color (hue), degree of purity of the color—or degree of separation from gray having the same color (saturation), and degree of brightness for the color ranging from black to white (luminance). Red, green, blue (RGB) color schemes are also popular and characterize video output from a display device according to combinations of red, green and blue values. Cyan, magenta, yellow and black (CMYK) is another color scheme regularly used to characterize video output from display device according to combinations of cyan, magenta, yellow and black values.

Translation between the color schemes is well known to one of skill in the art. Although the present invention has been described so far with respect to alterations in luminance in an HSL scheme, one of skill in the art will appreciate that power conservation techniques described herein may be programmed or stored according to one color scheme, and output according to another color scheme on the display device. For example, video data manipulation techniques described herein may be programmed or stored in an HSL scheme, and then converted to and implemented on an RGB based display device. Many output devices employ an RGB color scheme for video output. These display devices may include a red, green, and blue optical modulation element for each pixel, such as individual RGB light emitting diode emitters for an OLED display device, individual RGB filters for an LCD device, or a digital micromirror element used in a projector that sequentially and selectively reflects incident red, green and blue light from a lamp and color wheel into a projection lens. In an RGB based device, individual optical modulation elements receive commands for video output that include RGB values between 0 and 255 to produce a desired video output for a pixel. For example, one greenish color may initially comprise red/green/blue values of 45/251/62. According to luminance reduction techniques described above, the color may be darkened to 3/155/16, and subsequently darkened again to 2/90/9 (this maintains the same hue for the greenish color).

For an OLED display, the amount of current sent to an individual light emitting diode or filter increases with each color level between 0 and 255. Decreasing the color level for each RGB diode then reduces the amount of power for each pixel. More specifically, darkening and reducing luminance for a blue color having initial RGB values of 72/48/253 to 20/2/157 and again to 11/1/91 reduces the amount of current sent to each individual light emitting diode for each pixel. The amount of power conserved can then be determined by the known amount of current saved for all pixels in the inactive portion that are similarly altered.

Figure 2A:
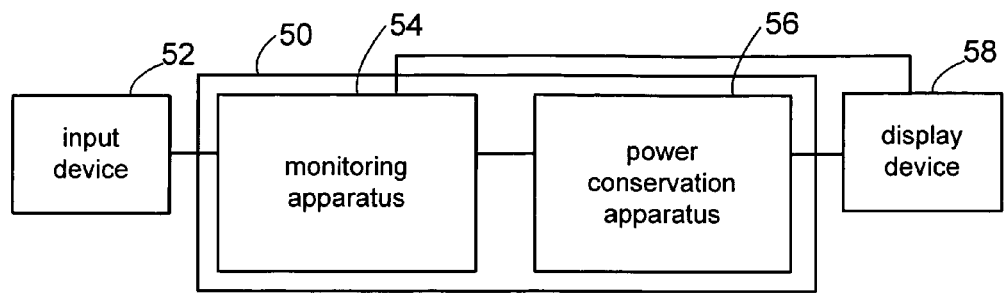
FIG. 2A illustrates a system for reducing power consumed by a display device in accordance with one embodiment of the present invention.

FIG. 2A illustrates a system 50 for reducing power consumed by a display device in accordance with one embodiment of the present invention. While the present invention will now be described as an apparatus composed of units, those skilled in the area will recognize that the present invention encompasses a method, process or software having as steps the actions performed by each unit and described below. System 50 comprises monitoring apparatus 54 and power conservation apparatus 56. In general, system 50 may comprise any combination of software and hardware for carrying out actions described herein. In one embodiment, monitoring apparatus 54 and power conservation apparatus 56 are implemented solely in software stored on a computer and run by a processor (such as a video or graphics chip or main processor). In another embodiment, general-purpose computer processing units, instead of dedicated hardware, implement the monitoring, active and inactive portion management, and video alteration techniques.

Coupled to system 50 are input device 52 and display device 58. Input device 52 allows a user to position a pointer within a display area of display device 58. Digitization of information provided by input device 52 will be described in further detail with respect to FIG. 5. Some popular input devices include a mouse, a position-sensing pad on a laptop computer, a stylus working in cooperation with a position-sensing display on a PDA, a positioning knob included on a keyboard of a laptop computer, one or more arrow keyboard keys, one or more buttons on a PDA, etc.

Monitoring apparatus 54 is designed or configured to monitor user activity in a display area for display device 58 and separate the display area into an active portion based on user activity in the active portion and an inactive portion that is outside the active portion. To do so, monitoring apparatus 54 is configured to receive digital information from input device 52 that describes spatial input from a user and is configured to access digital representations of spatial areas for individual graphics components in the display area. Monitoring apparatus 54 then compares digital information from input from device 52 and the digital representations, and differentiates between active and inactive portions of the display area. Monitoring apparatus 54 may also provide temporal information with regard to user activity by referencing user activity against temporal information received from a clock source. On one or more output lines, monitoring apparatus may output user activity information including: a) active and inactive portions of the display area, b) spatial information based on the position(s) of a pointer operated by the user, and c) temporal information related to user activity, such as an amount of time that each active and inactive portion has maintained its active and inactive status, respectively.

Power conservation apparatus 56 is designed or configured to receive user activity information produced by the monitoring apparatus 54. Power conservation apparatus 56 is designed or configured to alter video information in the inactive portion such that display device 58 will consume less power when displaying the altered video information than an amount of power that would be required to display the video information without the alteration. Several techniques that reduce power consumption for display device 58 based on video information alterations were discussed with respect to FIGS. 1A-1E. Power conservation apparatus 56 outputs the altered video information to display device 58. While apparatus 56 has been described as a discrete device, those skilled in the art will realize that apparatus 56 may include software that outputs a control signal useful for altering video information.

Display device 58 displays video information. In one embodiment, display device 58 outputs video information onto a screen comprising array of pixels. Display device 58 receives the altered video information from power conservation apparatus 56 or a buffer included in or associated with apparatus 56, and displays a) active portion video information in the active portion of the display area, and b) the altered video information in the inactive portion while the active portion video information is displayed.

Display device 58 varies its power consumption with video output. In one embodiment, display device 58 varies power consumption with the spatial distribution of light output in a display area. One such display device employs organic light emitting diodes (OLED) for video output. OLED displays are current driven devices where the intensity of light output from an OLED display is proportional to electrical current flow. Power output for the OLED device spatially varies by controlling and modulating electrical current levels through individual elements that are arranged for each pixel. For a color display, each pixel usually comprises three OLED element assemblies: one for red light, a second for blue light, a third for green light. Each assembly produces the color light directly or uses a colored filter, and RGB values are produced according to current input proportional to an RGB value, say from 0 to 255. Reducing RGB values for individual pixels—or RGB values via a luminance reduction—as described herein reduces power consumption for each assembly and each pixel, thereby cumulatively reducing current and power requirements for the an OLED display device. OLED displays are becoming increasingly popular for portable and battery powered devices, making power conservation techniques described herein particularly useful to conserve limited quantities of battery power. In another embodiment, display device 58 comprises a backlit LCD screen. In a specific embodiment, power conservation is attained by reducing backlit luminance for the entire screen or portions thereof while increasing transmittance for active areas at the reduced luminance.

The present invention is intended to be independent of any specific mechanism for light generation, power consumption or power savings for a display device, and only assumes that power consumption for display device 58 may vary with the spatial distribution of light output. The present invention may also be employed by cathode ray tube devices that would save energy by not supplying video information and power to inactive portions of the display screen. In addition, display devices that require power for addressing individual pixels for video output, such as those that require individual activation or addressing based on an RGB color scheme (e.g., filtering for LCD displays used in laptop computers), may also benefit from present invention by reducing power required to address or activate each color or filter element.

The present invention is particularly useful with display devices having a large display area. A user may often elect to use only a portion of the large display area. For example, a graphics component may include video output for menu or a word processing program that only covers a limited amount of a display area for device 58. In this case, the present invention alters video output outside these portions to reduce power required for the entire image.

Handheld computing devices are becoming increasingly popular. Most handheld devices are designed to regularly run from battery power. The present invention allows a handheld device to unequally consume power across its display area based on output video content. Thus, control menus and toggles, a clock, and frequently selected graphics components may include video information that is altered less while a main background portion is altered more aggressively to conserve power. Since these control items and frequently selected graphics may occupy less than 20% of the display area for these handheld devices, power conservation in this case may contribute to significant power savings and extended battery life for the handheld device.

Figure 2B:
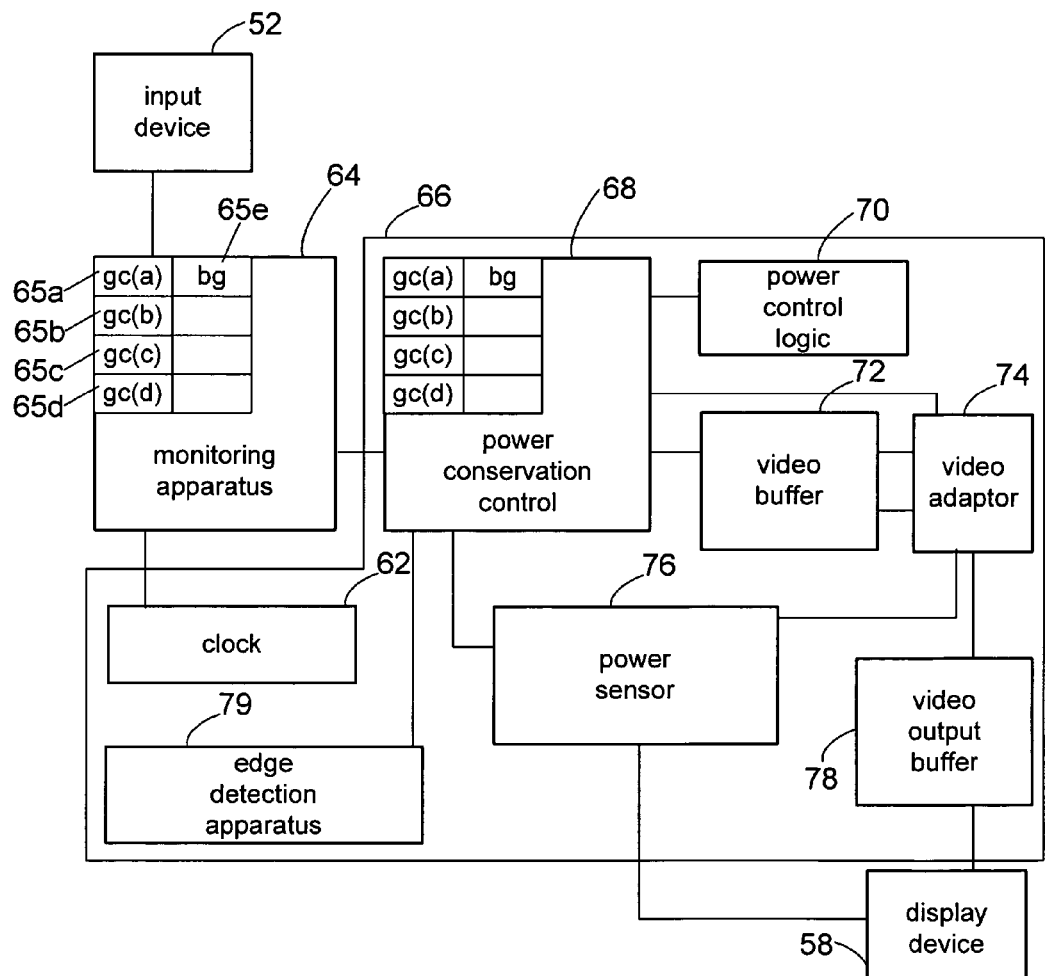
FIG. 2B illustrates a system for reducing power consumed by a display device in accordance with a specific embodiment of the present invention.

FIG. 2B illustrates a system 60 for reducing power consumed by a display device 58 in accordance with a specific embodiment of the present invention. While this embodiment of the present invention will now be described as an apparatus composed of units, those skilled in the area will recognize that the present invention encompasses a method, process or software having as steps the actions performed by each unit and described below.

System 60 comprises activity monitoring apparatus 64 and power conservation apparatus 66. Input device 52 and display device 58 were described with respect to FIG. 2A. Power conservation apparatus 66 comprises power conservation control 68, clock 62, edge detection apparatus 79, power control logic 70, at least one video buffer 72, video adaptor 74, power sensor 76, and at least one output video buffer 78. Each of the components for system 60 may be implemented in hardware, firmware or software, or a combination thereof. It should be noted that the functionality associated with a particular component may be centralized or distributed, whether locally or remotely.

Monitoring apparatus 64 separates a display area into an active graphics component based on user activity in a perimeter of the active graphics component. The perimeter defines the active portion and one or more inactive graphics components that are outside the active portion. In this case, display area includes four graphics components and monitoring apparatus 64 stores, or accesses data storage facilities that store, the position and parametric spatial boundaries for graphics components GC(a) 65a, GC(b) 65b, GC(c) 65c, GC(d) 65d, and background 65e. Based on user activity within the display area, monitoring apparatus designates any one of GC(a) 65a, GC(b) 65b, GC(c) 65c, GC(d) 65d, and background 65e as the active graphics component. The designation is based on user activity in a perimeter of one of the graphics component. The perimeter for this active graphics component then defines the active portion of the display area. The display area outside this perimeter defines the inactive portions of the display area. The other graphics components in this inactive area are then designated as inactive. For example, if GC(b) 65b is designated as active, graphics components GC(a) 65a, GC(c) 65c, GC(d) 65d, and background 65e are designated as inactive. Monitoring apparatus 64 has an input that from input device 52, shape detection apparatus 79 and an input that receives temporal calibration from clock 62 and provides temporal information with regard to user activity. Monitoring apparatus 64 has an output that provides user activity information.

Power conservation apparatus 66 alters video information in the inactive portion(s) such that the display device will consume less power when outputting the video information. Power conservation control 68 has an input that receives user activity information from monitoring apparatus 64, an input from clock 62 that receives temporal information, an input from edge detection apparatus 79 that receives perimeter information if needed, input from sensor 76 that receives an indication of power consumption, and an input from power control logic 70 that receives stored logic according to power conservation techniques described herein. Power conservation control 68 determines how video information in the inactive portion is altered to reduce power.

Power conservation control 68 determines an alteration to video information according to stored power conservation logic, and outputs a signal indicative of the alteration. To do so, control 68 coordinates input from monitoring apparatus 64, clock 62, power sensor 76, and power control logic 70. For example, control 68 may implement a luminance reduction scheme for a set of pixels in an inactive portion once a threshold activity time has been reached for a graphics component in the inactive portion. This luminance reduction then uses output from monitoring apparatus 64 to determine whether an inactive graphics component is available and to determine the spatial dimensions outside the active component for the inactive graphics component if the two graphics components overlap. Magnitude and timing of the luminance reduction are determined according to stored instructions acquired from power control logic 70. Input from clock 62 is used to determine when the threshold activity or power reduction interval time has been reached and when to apply the luminance reduction.

Power conservation control 68 is also configured to receive input from monitoring apparatus 64 to determine when to reactivate inactive portions. Thus, in response to user activity in the inactive portion, control 68 reactivates the video information in the inactive portion as it was existed before any alteration. To facilitate reactivation, video information for inactive portions that have been altered may be stored as it existed without any alterations in video buffer 72.

Power control logic 70 stores data and instructions that allow a processor to implement the techniques described herein. For example, power control logic 70 may include nonvolatile memory that stores timing parameters for a threshold inactivity time and power reduction interval established by a user. In one embodiment, the logic stores instructions that allow the user to set a threshold inactivity time and power reduction interval amongst a range of possible values. In another embodiment, the logic stores instructions that are implemented by design with no user input. Logic 70 may also store instructions that convert pixel values between color schemes to reduce one of a red, green, or blue value for a set of pixels in an inactive portion such that the display device will consume less power.

Video buffer 72 couples to an input of video adaptor 74 and stores video information. Video buffer 72 stores video information from one or more inactive portions without any alterations that reduce power consumption. Video buffer 72 may also store altered video information between consecutive alterations. More specifically, altered video information that exists before a first threshold inactivity time may be stored within video buffer 72, and stored before each subsequent alteration according to continuous power reduction intervals. Although video buffer 72 is illustrated as a single unit, is understood that buffer systems may employ one or more discrete storage components. In particular, different a buffer may be used to store video information without any alterations than a buffer used to store altered video information in between multiple power reduction intervals. One or more RAM memory components are suitable for use as video buffer 72.

In one embodiment, power conservation control 68 does not change video information and relies on outside source to do so. In this case, power conservation apparatus 66 includes a video adaptor 74 that receives a signal produced by power conservation control 68 and alters video information in the inactive portion based on the signal. Video adaptor 74 creates a set of signals that display pixelated video information for an image. Video adaptor 74 may correspond to a graphics controller, graphics co-processor, graphics accelerator, or other video controller that is commercially available from a variety of vendors. Such controllers are often available as cards that comprise a circuit board with memory and a dedicated processor. Video adaptor 74 may already be implemented within a computer system, as is common in desktop or laptop computer systems. An output line of video adaptor 74 provides the altered video data in the inactive portions. In one embodiment, video adaptor 74 converts digital information to analog information. In another embodiment, on laptops that comprise an LCD screen for example, the data remains digital.

Output video buffer 78 is configured to receive the altered video information from an output of video adaptor 74 and may receive unaltered video information from video buffer 72. Output video buffer 78 is configured or designed to output, to display device 58, a) active graphics component video information for display in the active portion of a display area, and b) the altered video information for display in the inactive portion. Display device 58 displays a) and b) simultaneously. Again, although output video buffer 78 is illustrated as a single unit, is understood that buffer systems may employ one or more discrete storage components. One or more RAM memory components are suitable for use as video buffer 72.

A clock 62 provides a temporal reference for user activity. Output lines for clock 62 are coupled to inputs for monitoring apparatus 64 and/or power conservation control 68; and provide a temporal signal to monitoring apparatus 64 and/or power conservation control 68. Most computer systems include a digital clock suitable for use as clock 62. Temporal information from clock 62 may be useful to allow power conservation apparatus 66 to alter video information in an inactive portion after a threshold inactivity time of inactivity in the inactive portion. In addition, temporal information from clock 62 allows power conservation apparatus to timely apply a second alteration to the altered video information in the inactive portion after a first power reduction interval.

In one embodiment, system 60 comprises a power sensor 76 that monitors power consumption—both active and predicted. Power sensor 76 may: detect power actively consumed by display device 58, estimate power consumption based on video output from video adaptor 74, track available power resources provided by a battery, and estimate power conservation and savings based on control signals and alterations to video output provided by control 68. Power sensor 76 is coupled to power conservation control 68. In one embodiment, power sensor 76 provides an estimation of power savings and consumption for altered video information. In a specific embodiment, power sensor 76 couples to video adaptor 74 and provides an estimation of power savings and consumption for the altered video information based on the altered video information output from video adaptor 74. This may be accomplished by mathematical analysis of power required by display device for video output, versus the altered video information. For an OLED device where current is proportional to video output for each individual pixel, this analysis may constitute determining the power required for altered video information based on a cumulative assessment of power consumption for individual pixels in an inactive portion of the display area.

An estimation of power consumption may also be provided for an active portion without any alterations. Power sensor 76 may then provide power consumption output for a display area that spatially varies according to an active portion and one or more inactive portions. Power sensor 76 may also provide an estimation of spatial power consumption that would be required for an inactive portion before any alteration, which is useful for comparative purposes and quantifying conservation. An output line of power sensor 76 couples to an input of power conservation control 68 and allows control 68 to alter video output based on one or more of: power actively consumed by display device 58, video output from video adaptor 74, and available power provided by a battery, all of which can be combined with estimated power conservation for alterations to video information determined by control 68.

In one embodiment, system 60 also employs an edge detection apparatus 79 that facilitates spatial mapping of graphics components. Thus, edge detection apparatus 79 may be called upon by monitoring apparatus 64 to produce perimeter information for graphics components that do not readily include characteristic perimeter information in their bitmap. Edge detection apparatus 79 then probes video information for a graphics component (such as that included in a bitmap for the graphics component), builds a perimeter or shape based on the video information, and outputs the perimeter information for the graphics component to one of monitoring apparatus 64, power conservation control 68 or buffer 72 for storage therein.

Figure 3:
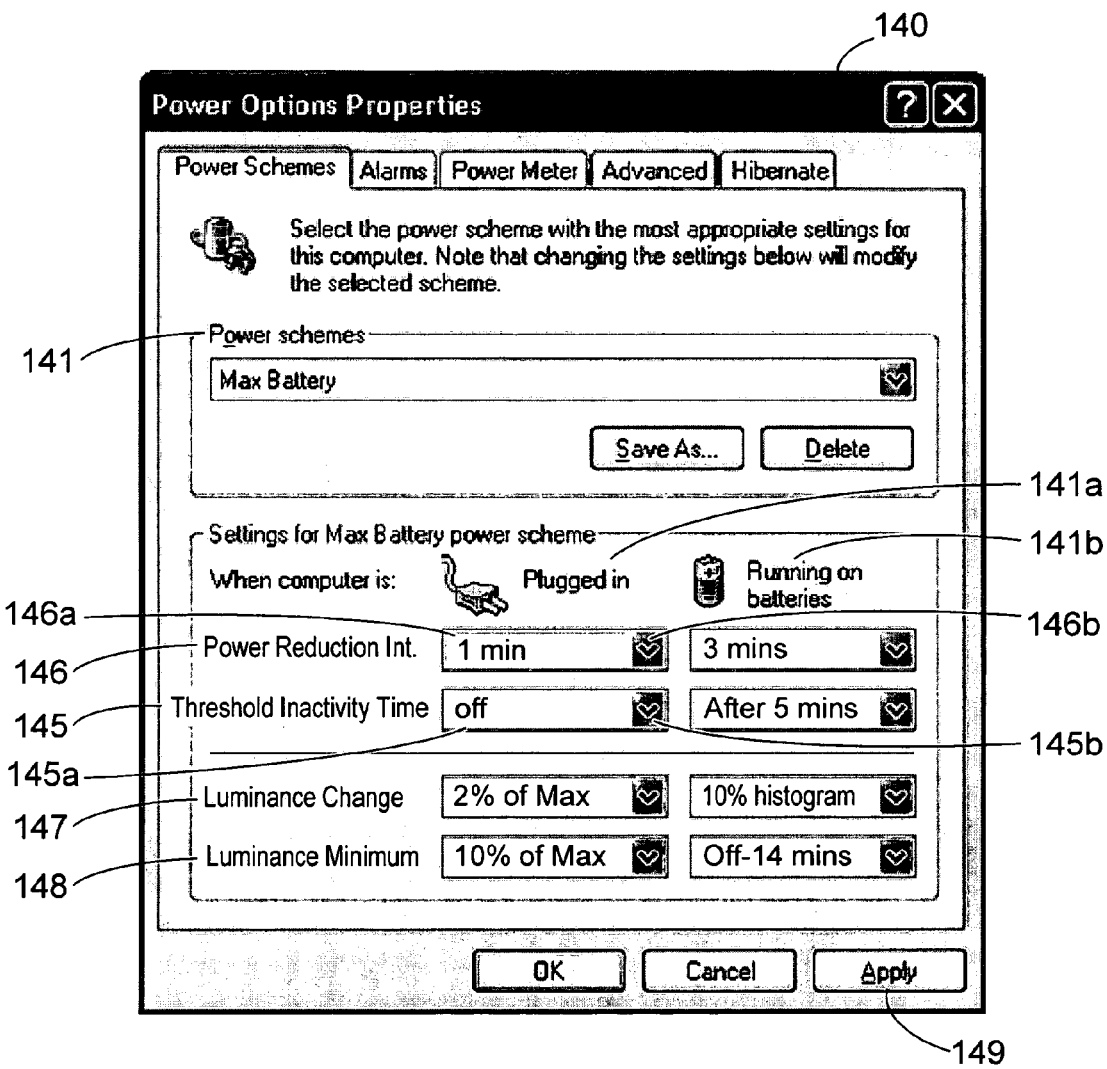
FIG. 3 illustrates a power conservation graphics control for applying power conservation techniques in accordance with one embodiment of the present invention.

Graphics-based user interfaces employ what are referred to as graphics "controls". A graphics control is a discrete video object, for display by a display device, which can be manipulated by a user to alter one or more graphics outputs or effects and/or to initiate an action in an associated application program. The graphics control often includes its own bitmap comprising an array of pixel values. FIG. 3 illustrates a power conservation graphics control 140 for applying power conservation techniques in accordance with one embodiment of the present invention.

Power conservation graphics control 140 facilitates interface between a user and a program run on a computer that allows the user to alter power consumption for a display device which outputs video information for the computer. Specifically, graphics control 140 allows the user to alter video information output by a display device to reduce power consumption.

Power conservation graphics control 140 comprises a number of power conservation control tools 142-149 that allow a user to set one or more parameters for a power conservation program, which alters video information in an inactive portion of a display area that is outside an active portion of the display area. The power conservation program alters video data in response to user inactivity in the inactive portion such that the display device will consume less power when simultaneously displaying the video information in the active portion and the altered video information in the inactive portion than an amount of power that would be required to display the video information in the active portion and the inactive portion without the alteration. The power conservation control tools 142-149 have a text labels that, along with their pictorial representations, describes their function.

Power conservation graphics control 140 allows the user to set one or more power schemes 141. A power scheme refers to a predefined collection of power options, and simplifies usage by allowing the user to set multiple parameters with a single choice and action. Two power schemes are shown for graphics control 140: 'plugged in' scheme 141a and 'battery use' scheme 141b. Other exemplary power schemes include laptop use and PDA use. A user may apply a power scheme as is. Alternatively, power schemes 141 allow a user to tailor and apply customized settings by using a pre-existing power scheme as a starting point for customization. Power scheme control 141 thus allows a user to customize video alteration response for different power states of the computer, operation states for the computer system, different display devices, and different graphics components. Responses for graphics components will vary with the device and programs installed thereon, and may include separate responses for a word processing program, an Internet Browser interface, a graphics control, a music player program, and a video game, for example.

A threshold time tool 145 allows a user to set a threshold inactivity time after which the video information in the inactive portion is altered for the first time. A window 145a allows a user to input a desired threshold inactivity time, while a scroll button 145b allows a user to select a threshold inactivity time from a stored set of threshold times. This may be done for each power scheme 141. The user may input a desired threshold inactivity time by moving an on-screen pointer or manipulanda to window 145a and typing a desired time. The graphics-based user interface interprets this input as an instruction from the user, and adapts power conservation control according to the input. In one embodiment, a user may set a threshold inactivity time from about 10 seconds to about 2 hours. In another embodiment, the user may set the threshold inactivity time from about 1 minute to about 10 minutes. Threshold time tool 145 also includes an 'off' state that turns this option off. In this case, power conservation is applied immediately upon inactivity in an inactive portion according to the power reduction interval time.

An interval time tool 146 allows a user to set a power reduction interval at which the video information in the inactive portion is continuously altered after each power reduction interval. A window 146a allows a user to input a desired power reduction interval, while a scroll button 146b allows a user to select a power reduction interval from a stored set. Again, this may be done for each power scheme 141.

A luminance reduction tool 147 allows a user to set a luminance reduction for video information in the inactive portion. In one embodiment, tool 147 allows the user to set luminance reductions using a relative magnitude, such as a percentage of a maximum luminance or relative sizes of a histogram that characterizes video information in the inactive portion. As shown, 'plugged in' scheme 141a shows a scalar 2 percent luminance reduction of the maximum luminance for the display area, which will occur at each power reduction interval. Battery use scheme 141b shows a 10 percent histogram compression, which will occur at the threshold inactivity time and at each power reduction interval.

A luminance minimum tool 148 allows the user to set a lower luminance limit that sets a minimum luminance value for pixels in the inactive portion. The lower luminance limit may be a minimum luminance based on the original luminance for a pixel, as is currently set for 'plugged in' scheme 141a. Battery use scheme 141b alternately shows a shut off that is applied after 15 minutes, which turns all video information in the inactive portion to black at the specified time.

An apply button 149 allows a user to initiate changes made within graphics control 140 onto the display device and graphics-based user interface. Thus, after specific changes and power consumption parameters are selected and set, the user may click apply button 147 to initiate the changes.

In addition to the specific tools described above, power conservation tools for graphics control 140 may include combinations of common conventional graphics control tools such as buttons, options, scroll bars, pictures, spin dials, list boxes, text boxes, etc. For example, a check box is a control tool that comprises an empty box. When a user selects the box, it is filled with an "X" or other suitable information to indicate that the user has selected an option corresponding to the box. One or more check boxes may be used to allow a user to quickly select from one or more predetermined luminance reduction schemes. Graphics control 140 also includes a 'cancel' button that closes graphics control window 140 without initiating any changes, and an 'OK' button that closes graphics control window 140 and applies any changes as described above.

Figure 4A:
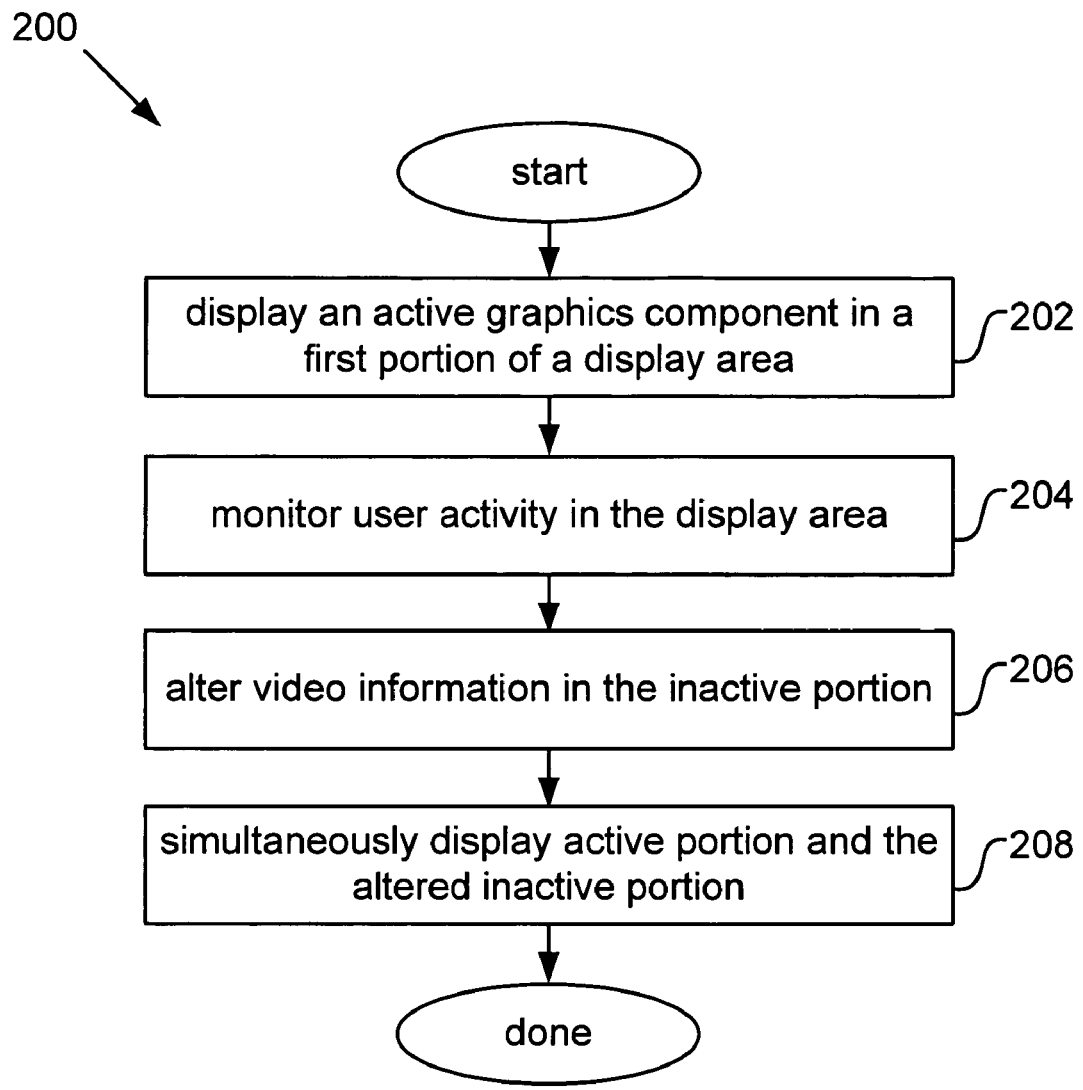
FIG. 4A illustrates a process flow for reducing power consumed by a display device in accordance with one embodiment of the invention.

FIG. 4A illustrates a process flow 200 for reducing power consumed by a display device in accordance with one embodiment of the invention. While the present invention will now be described as a method and separable actions for reducing power consumption, those skilled in the art will recognize that the subsequent description may also illustrate hardware and/or software systems and components capable of performing the method and actions.

Process flow 200 begins by displaying an active graphics component in a first portion of a display area provided by the display device (202). The active graphics component implies user activity within its boundaries, the nature of which will depend on the program or application associated with the graphics component. Common active graphics component output video information for one of: a word processing program, an Internet Browser interface, a graphics control, a music player program, and a video game, for example. User activity for the graphics control may include the manipulation of buttons, options, scroll bars, pictures, spin dials, list boxes, text boxes, and other activities described above with respect to FIG. 3.

Process flow 200 monitors user activity within the display area (204). This comprises spatially determining the location of user input and whether the input extends outside the active graphics component. In response to user inactivity in an inactive portion of the display area that is outside the first portion, video information in the inactive portion is then altered such that the display device will consume less power when displaying the altered video information than an amount of power that would be required to display the video information without the alteration (206).

After the alteration, the active graphics component is simultaneously displayed in the first portion while displaying the altered video information in the inactive portion (208).

Figure 4B:
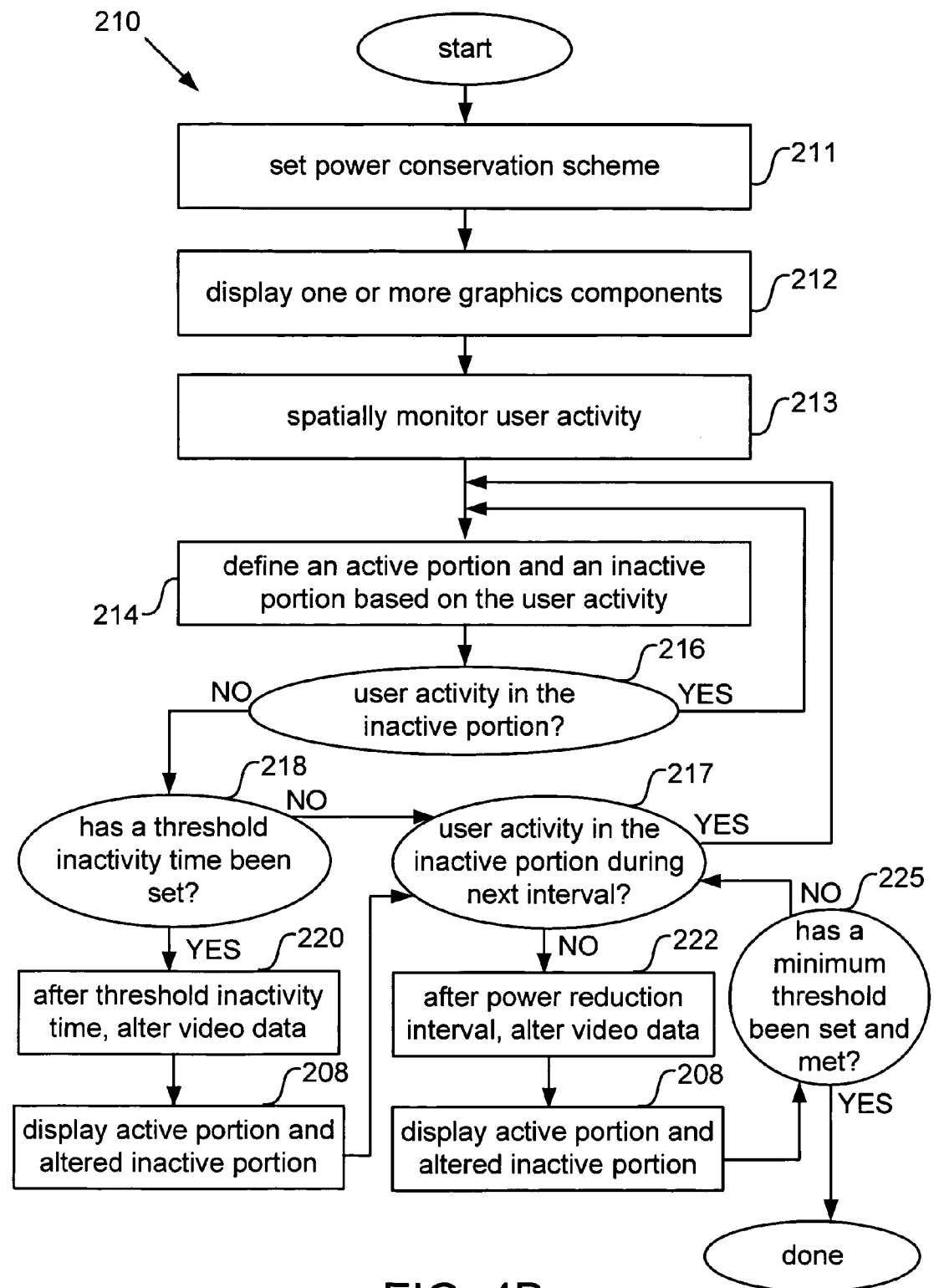
FIG. 4B illustrates a process flow for reducing power consumed by a display device in accordance with one embodiment of the invention.

FIG. 4B illustrates a process flow 210 for reducing power consumed by a display device in accordance with another embodiment of the invention. Process flow 210 begins by setting a power conservation scheme (211). A power scheme refers to a collection of power options that dictate how and when video information is altered to reduce display device power consumption. In one embodiment, a graphics control such as that described with respect to FIG. 3 may allow a user, for example, to set a lower limit that sets a minimum RGB value for pixels in inactive portion. In another embodiment, a power conservation system is stored on a computer and implements a power conservation scheme as described above without user input.

After the power conservation scheme has been established, one or more graphics components are initiated and displayed by the user and computer system (212). Process flow 200 then monitors user activity within the display area and graphics components (213). This comprises spatially determining the location of user input and whether it is within the bounds of a graphics component. Based on the user input, process flow 210 defines an active portion and one or more inactive portions based on the user activity (214).

Process flow 210 then monitors activity in the inactive portion over time to determine if user activity in the inactive portion continues (216). If user activity occurs in the inactive portion, process flow 210 then returns to defining a new active portion and new inactive portions based on the user activity (214). If no user activity occurs, a check is made as to whether a threshold inactivity time has been established according to the power conservation scheme (218). In one embodiment, the present invention employs a threshold inactivity time from about 10 seconds to about 2 hours. In another embodiment, the present invention employs a threshold inactivity time from about 1 minute to about 10 minutes.

If a threshold inactivity time has been set, and user inactivity in the inactive portion continues until the threshold inactivity time, then process flow 210 alters video information in the inactive portion according to a change determined in the power scheme for the threshold inactivity time (220). In a specific embodiment, this comprises altering video information not required for shape detection of the graphics component. Suitable shape detection reductions techniques, such as reducing for internal portions of a graphics component having a large white internal portion, were described respect to FIGS. 1A-1E. For color display outputs, the alteration commonly reduces one of a red, green, or blue value for a set of pixels in the inactive portion such that the display device will consume less power when displaying the altered video information. After the video information is changed, the active graphics component and altered video information are then simultaneously displayed (208).

After the threshold inactivity time alteration (220) and display (208), process flow 210 continues to monitor user activity in the inactive portion (217). If user inactivity in the inactive portion continues for a power reduction interval, a second alteration is applied to the video information in the inactive portion such that the display device will consume less power when displaying the secondly altered video information than an amount of power that would be required to display the video information without the second alteration. The second alteration occurs after the power reduction interval according to a change determined for the power reduction interval (222). For example, the second alteration may comprise a second alteration to the video information not required for shape detection that results in greater power conservation than the first alteration. In one embodiment, a power reduction interval from several milliseconds to about 30 minutes is suitable for some graphics based user interfaces. In another embodiment, a power reduction interval from about 1 minute to about 10 minutes is suitable. After the video information is changed, the active graphics component and altered video information are then simultaneously displayed (208).

If a threshold inactivity time has not been established (218), alteration occurs directly according to the power reduction interval scheme. In a specific embodiment, video alteration occurs on a gradual and high frequency basis. In this case, video information within the inactive portion may begin, for example, within ten seconds, 5 seconds or 1 second of user inactivity. Subsequent minute alteration may occur at a high frequency such that noticeable changes to the video information are not substantially detectable. Subsequent minute alterations may include small scalar luminance reductions applied at each power reduction interval.

Steps 217, 222, and 208 may then continue to repeat based on user inactivity in the inactive portion and according to power scheme design, e.g., for a third alteration and power reduction. In one embodiment, the present invention increases alterations to video data in subsequent alterations such that reductions in power consumption begin gradually and increase as time proceeds. The power scheme may also include a stop condition that prevents further alteration of video data (225). In one embodiment, process flow 210 applies a lower limit that limits pixel values in the inactive portion. For example, the lower limit may be a percentage of initial pixel value for a pixel, such as an initial luminance or chroma value. If the lower limit has been met for every pixel in the inactive portion, process flow 210 is finished. Until this condition is met, steps 217, 222, and 208 may repeat. In addition, if user activity occurs in the inactive portion (217) before the next power reduction interval, process flow 210 restores the video information in the inactive portion to its original state before any alterations were applied (224) and process flow 210 returns to defining a new active portion and new inactive portions based on the user activity (214).

Figure 4C:
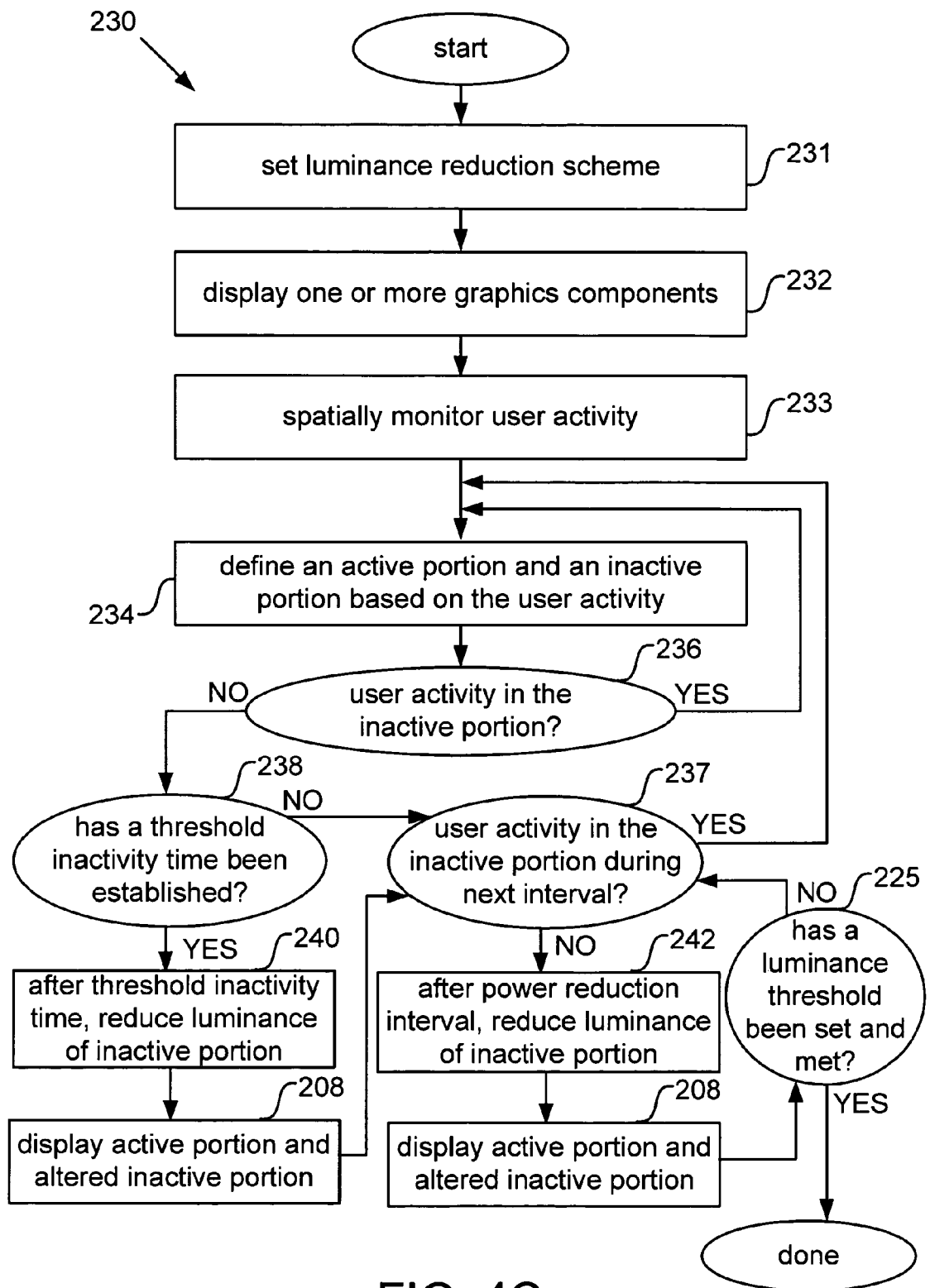
FIG. 4C illustrates a process flow for reducing luminance in one or more inactive portions in accordance with one embodiment of the invention.

FIG. 4C illustrates a process flow 230 for reducing luminance in one or more inactive portions in accordance with one embodiment of the invention. Process flow 230 begins by setting a luminance reduction scheme (231). A graphics control such as that described with respect to FIG. 3 may allow a user, for example, to set a lower luminance limit that sets a minimum luminance value for pixels in inactive portion. After the power conservation scheme has been established, one or more graphics components are initiated and displayed (232). Process flow 200 then monitors user activity within the display area and graphics components (233) and defines an active portion and one or more inactive portions based on user activity (234).

Process flow 230 monitors activity in the inactive portion to determine if user activity in the inactive portion continues (236). If no user activity occurs, and if a threshold inactivity time has been set, and user inactivity in the inactive portion continues until the threshold inactivity time, then process flow 230 alters video information in the inactive portion according to a change determined in the luminance reduction scheme for the threshold inactivity time (240). In one embodiment, altering the video information comprises a luminance reduction for set of pixels in the inactive portion. Suitable luminance reductions techniques, such as reducing luminance value for the set of pixels by a constant value, were described respect to FIGS. 1A-1E. After the luminance reduction, the active graphics component and altered video information are then simultaneously displayed (208).

If user inactivity in the inactive portion continues for a power reduction interval (237), a second luminance reduction is applied to the video information in the inactive portion (242). In one embodiment, the second alteration may comprise a second luminance reduction that is greater than the first luminance reduction or uses one or more histogram manipulation techniques. In another embodiment, alteration includes a histogram compression of pixel values for a set of pixels in the inactive portion. This may be followed by a reduction of pixel values for the set of pixels using a constant that gives a pixel with the lowest histogram value a zero value.

After the video information is changed, the active graphics component and altered video information are then simultaneously displayed (208).

Steps 237, 242, and 208 may then continue to repeat based on user inactivity in the inactive portion and according to a predetermined power scheme. Some stop conditions suitable for use for with continuous luminance reduction schemes include when a histogram for the set of pixels reaches a minimum width (either through scalar manipulation or histogram compression) or when a maximum luminance value in the inactive portion reaches a predetermined minimum luminance. If the lower limit has been met, process flow 230 finishes. Steps 237, 242, and 208 repeat until the lower limit has been met. In addition, if user activity occurs in the inactive portion (237) before the next power reduction interval, process flow 230 restores the video information in the inactive portion to its original state before any alterations were applied (244) and process flow 230 returns to defining a new active portion and new inactive portions based on the user activity (234).

In one embodiment, process flow 210 or 230 also differentiates between multiple inactive portions, such as individual inactive graphics components. In this case, process flow 230 may apply different luminance reduction schemes to each graphics component. For example, video information in a background may be altered more aggressively than video information in a music player program graphics component. The present invention may also apply different threshold inactivity time (loop 218, 220, and 208) and power reduction intervals (loop 217, 222, and 208) for each graphics component. In addition, power schemes may be set up for each graphics components type by a user such that the graphics-based user interface applies a customized power conservation. In this case, the user may set large alterations to background video information to decrease power consumption from the background. Different portions of a single graphics component may also be altered at different rates, such as a control bar, toggle, icon and clock included in a background. Alternatively, a border portion of a graphics component that outputs video information for a spreadsheet program may be altered less than an internal portion that comprises text.

Figure 5:
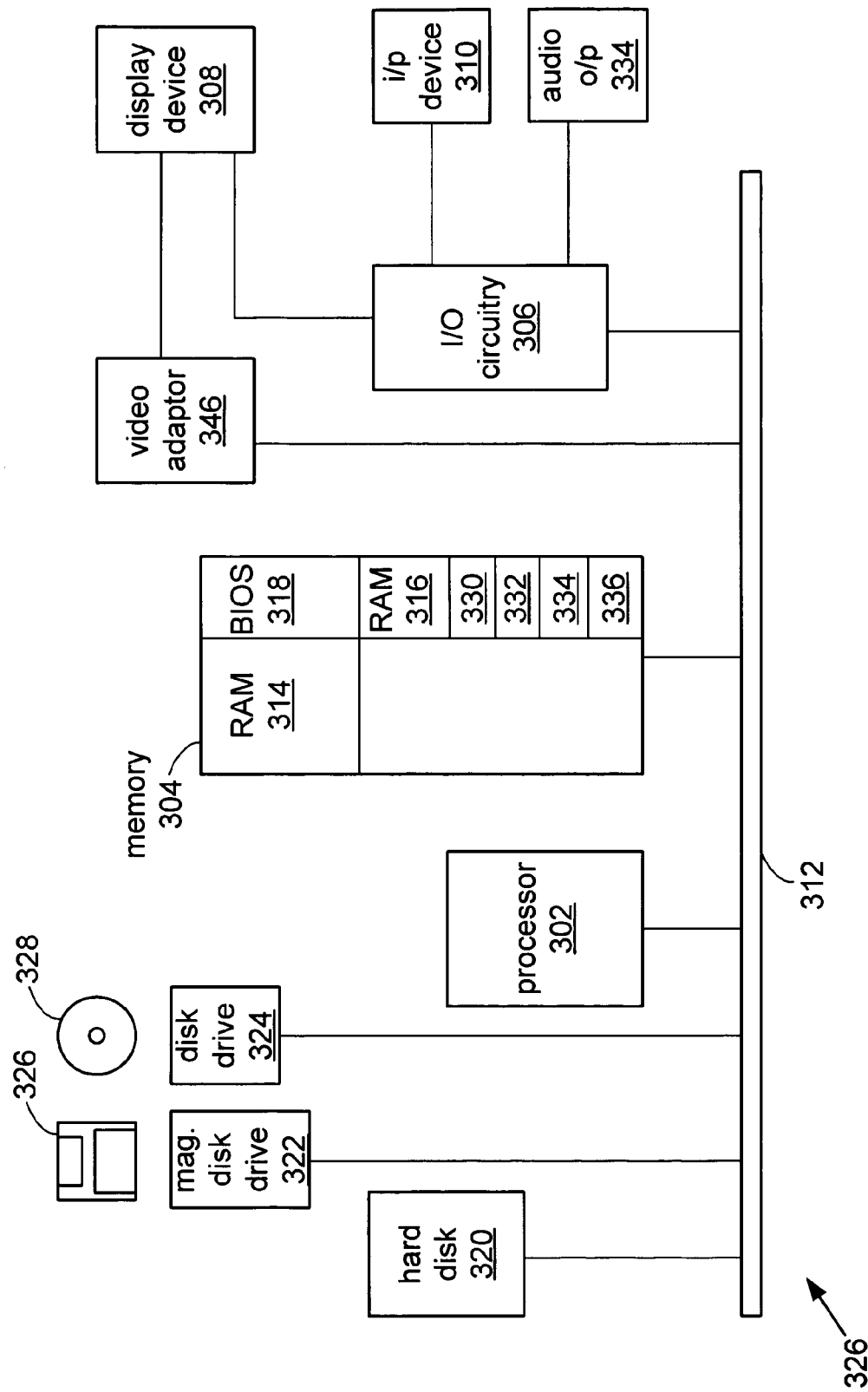
FIG. 5 illustrates an exemplary computer system suitable for implementing the invention.

The present invention finds use with computer systems such as desktop and laptop computers, personal digital assistants (PDAs), portable computer systems, and the like. FIG. 5 illustrates an exemplary general-purpose computer system 300, representing a personal computer suitable for implementing the present invention.

Computer system 300 comprises a processor, or CPU, 302, system memory 304, input/output (I/O) circuitry 306, display device 308, input device 310, and system bus 312. System bus 312 permits digital communication between system memory 304 and processor 302, as well as permits digital communication between other components within system 300 and processor 302 and/or system memory 304.

System memory 304 includes read only memory (ROM) 314 and random access memory (RAM) 316. ROM 314 stores a basic input/output system 318 (BIOS), containing basic routines that help to transfer information between elements within computer system 300, such as during start-up. Computer system 300 may also include a hard disk drive 320, a magnetic disk drive 322, and an optical disk drive 324. Magnetic disk drive 322 reads from and writes to a removable floppy disk 326. Optical disk drive 324 reads from and may write to a CD-ROM disk 328 or other optical media. The drives and their associated computer-readable media provide non-volatile storage for system 300. A number of program modules may be stored in the drives, system memory 304, and/or RAM 310, including an operating system 330, one or more application programs 332, other program modules 334, and program data 336. Although the description of computer-readable media above refers to a hard disk, a removable magnetic disk and a CD-ROM disk, those skilled in the art will appreciate that other types of media are readable by a computer system, such as magnetic cassettes, flash memory cards, USB memory sticks, digital video disks, and the like. In addition, not all computer systems, such as PDAs and other portable devices may include every component shown with respect to system 300.

Processor 302 is a commercially available microprocessor such as one of the Intel or Motorola family of chips, or another suitable commercially available processor. Processor 302 digitally communicates with system memory 304 via system bus 312, which may comprise a data bus, control bus, and address bus for communication between processor 302 and memory 304. CPU 302 is also coupled to the I/O circuitry 306 by system bus 312 to permit data transfers with peripheral devices.

I/O circuitry 306 provides an interface between CPU 302 and such peripheral devices as display device 308, input device 310, audio output 334 and/or any other I/O device. For example, a mouse used as input device 310 may digitally communicate with processor 302 through a serial port 306 that is coupled to system bus 312. Other interfaces, such as a game port, a universal serial bus (USB) or fire wire, may also provide digital communication between a peripheral device and processor 302. I/O circuitry 306 may also include latches, registers and direct memory access (DMA) controllers employed for interface with peripheral and other devices. Audio output 334 may comprise one or more speakers employed by a headphone or speaker system.

Display device 308 is for displaying video information—both unaltered and altered—including graphics components, backgrounds, graphics controls such as those described herein, graphics-based user interfaces as described herein, and other visual representations of data. Display device 308 may comprise a cathode ray tube (CRT), liquid crystal display (LCD), organic light emitting diode (OLED), or plasma display, of the types commercially available from a variety of manufacturers. Display device 308 may also comprise one or more optical modulation devices, or the like, used in projecting an image. Projection display devices that project an image onto a receiving surface are becoming more popular, less expensive, more compact; and may employ one or more optical modulation technologies as well as a wide variety of individual designs. Common optical modulation devices include those employing liquid crystal display (LCD) technology and digital mirror device (DMD) technology. When used as a display device for a computer, these projection devices provide the potential for a much larger image size and user interface.

Display device 308 may also digitally communicate with system bus 306 via a separate video interface, such as a video adapter 346. Video adapter 346 may be responsible for assisting processor 302 with video graphics processing including alterations as described herein. Video adapter 346 may be a separate graphics card or graphics processor available from a variety of vendors that are well known in the art.

Input device 310 allows a user to enter commands and information into the computer system 300, and may comprise a keyboard, a mouse, a position-sensing pad on a laptop computer, a stylus working in cooperation with a position-sensing display on a PDA, or the like. Other input devices may include a remote control, microphone, joystick, game pad, scanner, or the like. As a further alternative, input device 332 may be any set of switches capable of communicating a user input to computer system 350. Therefore, as used herein, the term input device will refer to any mechanism or device for entering data and/or pointing to a particular location on an image of a computer display. Input as described herein may also come through intermediary devices. For example, a remote control may communicate directly with processor 302, or through an intermediary processor included in another device such as a VCR, television, a hybrid entertainment device such as a set-top box, or projector. The user may then input information to computer system 300 using an infrared remote control device that communicates first with the intermediary device, and then to processor 302.

In operation, input device 332 allows a user to position a pointer and create active portions according to their input. The user input may also include input analyzed by processor 302 that specifies one or more power scheme options. In one embodiment, a graphics-based user interface implemented by computer system 300 is programmed to respond to commands from processor 302 to display graphics controls such as those described above. To display a power conservation graphics control, processor 302 issues an appropriate command, followed by an identification of data that is to be used to construct the graphics control. As described above, such data comprises a number of power conservation control tools that allow a user to change how video data is altered due to inactivity. The graphics control may store and call a bitmap of pixel values relating to each power conservation control tool. System memory 304 also stores a number power conservation commands and instructions for implementing the techniques described herein. The present invention may be practiced in the context of an application program that runs on an operating system implemented by computer system 300 or in combination with other program modules on computer system 300.

The present invention may be implemented on a range of computer systems. In addition to personal computers such as desktop computers and laptop computers, a variety of other computer systems and computer devices employing a digital processor, memory and a display device may implement the present invention. Handheld computers and other small portable digital devices such as cell phones and digital cameras are increasingly integrating video display and computer functionality, including the ability to access the resources of an external network such as the Internet and the ability to output video data to external display devices. One current trend is hybrid entertainment devices that integrate the functionality of computer systems, audio, and televisions. In addition, set-top boxes associated with cable television services are becoming much more sophisticated user interfaces as interactive services become available to cable customers. Any of these devices may employ and benefit from the power conservation methods and systems described herein, particularly when the systems are run on battery power. The scope of digital computer systems is expanding hurriedly and creating many systems and devices that may employ the present invention. In general, any digital device employing an output display device that varies output power with video content may benefit from the present invention. Moreover, those skilled in the art will appreciate that the invention may be practiced with other computer system configurations, multiple display device systems, multiprocessor systems, microprocessor-based or programmable consumer electronics, minicomputers, mainframe computers, and the like. The present invention may also be practiced on any system running a graphics-based user interface from a computer-readable memory such as internal electronic memory, magnetic-based mass storage, and/or optical-based mass storage. The memory is programmed to implement the techniques described above.

The present invention is particularly useful to portable computing devices run with battery power, such as laptop computers, MP3 playeers and personal digital assistants. Power conservation according to present invention may also lead to secondary power savings benefits. For a portable computing system that employs an OLED display device for example, a reduction in current for individual pixel elements to display less bright video information also results in less heat generation. This allows the portable device to spend less battery and limited energy on heat dissipation, reserving more energy for display and other functions. In addition, although the present invention has been discussed with respect to reduced power consumption, energy and power are intended to be interchangeable.

Embodiments of the present invention further relate to computer readable media that include program instructions for performing various computer-implemented techniques. The media and program instructions may be those specially designed and constructed for the purposes of the present invention, or any kind well known and available to those having skill in the computer software arts. Examples of computer-readable media include, but are not limited to, magnetic media such as hard disks, floppy disks, and magnetic tape; semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher level code that may be executed by the computer using an interpreter.

Graphics controls and graphics-based user interfaces such as those described herein may be implemented using a number of computer languages. One suitable language is Java, available from Sun Microsystems of Sunnyvale, Calif. Another suitable language is the Microsoft Windows.RTM. programming environment, detailed in the Microsoft Windows 3.1 Guide to Programming, Redmond, Wash.: Microsoft Press, 1987-1992, in which the graphics controls may be implemented using operating system calls.

Although the foregoing invention has been described in some detail for purposes of clarity of understanding, those skilled in the art will recognize that various modifications may be made within the scope of the appended claims. For example, although the present invention has described luminance reduction of a background and graphics component at separates rates, it is understood that luminance reduction may occur at the same value for any video information outside an active portion. In addition, although the threshold time tool 145 of FIG. 3 allows a user to turn on/off a threshold inactivity time using a window and scroll button 145b, the user may turn on/off the threshold time on/off with a toggle or button. The invention is, therefore, not limited to the specific features and embodiments described herein and claimed in any of its forms or modifications within the scope of the appended claims.

What is claimed is:

1. A method for reducing power consumed by a display device, the method comprising:
   displaying an active graphics component in a first portion of a display area provided by the display device;
   in response to user inactivity in an inactive portion of the display area that is outside the first portion, altering video information in the inactive portion using a histogram manipulation of luminance values for a set of pixels in the inactive portion such that the display device will consume less power when displaying the altered video information than an amount of power that would be required to display the video information without the alteration, wherein altering the video information includes a) altering the luminance values using a histogram compression of a histogram to produce compressed luminance values, and b) reducing the compressed luminance values using a constant, and wherein a) and b) occur at a threshold inactivity time; and simultaneously displaying the active graphics component in the first portion and the altered video information in the inactive portion.

2. The method of claim 1 wherein the histogram is compressed only on one side of a mean, median or mode for the pixel values.

3. The method of claim 2 wherein the histogram is compressed only for pixel values greater than the mean, median or mode for the pixel values.

4. The method of claim 1 further comprising repeating a) and b) at multiple subsequent power reduction intervals.

5. The method of claim 4 further comprising stopping the repetition of a) and b) when a new luminance histogram produced by a) and b) for the set of pixels reaches a minimum width.

6. The method of claim 4 further comprising stopping the repetition of a) and b) when a maximum luminance in a new luminance histogram produced by a) and b) reaches a predetermined minimum luminance.

7. The method of claim 1 wherein the active graphics component outputs video information for one of: a word processing program, an Internet Browser interface, a graphics control, a music player program, and a video game.

8. The method of claim 1 wherein the alteration reduces one of a red, green, or blue value for the set of pixels in the inactive portion such that the display device will consume less power when displaying the altered video information.

9. The method of claim 1 wherein the constant includes a function of one of i) a maximum luminance for the inactive portion, ii) a maximum luminance provided by the display device, iii) a mean, median or mode of luminance values for an inactive portion, and iv) a mean, median or mode of a luminance range values provided by the display device.

10. The method of claim 1 wherein the constant includes less than 1 percent of the maximum luminance for the inactive portion or the maximum luminance provided by the display device.

11. The method of claim 1 wherein the histogram manipulation substantially maintains relative luminance levels in the video information that existed before the alteration without turning the video information to black.

12. A computer readable medium including instructions for reducing power consumed by a display device, the computer-readable medium comprising:

displaying an active graphics component in a first portion of a display area provided by the display device;

instructions for, in response to user inactivity in an inactive portion of the display area that is outside the first portion, altering video information in the inactive portion using a histogram manipulation of luminance values for a set of pixels in the inactive portion such that the display device will consume less power when displaying the altered video information than an amount of power that would be required to display the video information without the alteration, wherein the instructions for altering the video information include a) instructions for altering the luminance values using a histogram compression of a histogram to produce compressed luminance values, and b) instructions for reducing the compressed luminance values using a constant, and instructions for altering the video information at a threshold inactivity time; and instructions for simultaneously displaying the active graphics component in the first portion and the altered video information in the inactive portion.

13. A method for reducing power consumed by a display device, the method comprising:

displaying an active graphics component in a first portion of a display area provided by the display device;

in response to user inactivity in an inactive portion of the display area that is outside the first portion, altering video information in the inactive portion using a histogram manipulation of luminance values for a set of pixels in the inactive portion such that the display device will consume less power when displaying the altered video information than an amount of power that would be required to display the video information without the alteration; and simultaneously displaying the active graphics component in the first portion and the altered video information in the inactive portion.

14. The method of claim 13 wherein the histogram manipulation includes a histogram compression of a histogram including the pixel values and produces compressed pixel values.

15. The method of claim 14 further comprising reducing the compressed pixel values using a constant.

16. The method of claim 13 wherein the alteration reduces one of a red, green, or blue value for the set of pixels in the inactive portion such that the display device will consume less power when displaying the altered video information.

17. The method of claim 13 wherein the alteration reduces a backlight level for the set of pixels in the inactive portion.

18. The method of claim 13 wherein the histogram manipulation includes a histogram shift of a histogram of the pixel values using a constant.

19. The method of claim 18 wherein the constant value includes a function of one of i) a maximum luminance for the inactive portion, ii) a maximum luminance provided by the display device, iii) a mean, median or mode of luminance values for an inactive portion, and iv) a mean, median or mode of a luminance range values provided by the display device.

20. The method of claim 13 wherein the histogram manipulation substantially maintains relative luminance levels that existed before the alteration in the video information for the set of pixels in the inactive portion.

* * * * *